US011310567B2

(12) United States Patent
Hardin et al.

(10) Patent No.: US 11,310,567 B2
(45) Date of Patent: Apr. 19, 2022

(54) APPARATUS AND METHODS FOR THUMBNAIL GENERATION

(71) Applicant: Time Warner Cable Enterprises LLC, St. Louis, MO (US)

(72) Inventors: Glen Hardin, Charlotte, NC (US); Eric Manchester, Rockville, MD (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 16/532,329

(22) Filed: Aug. 5, 2019

(65) Prior Publication Data

US 2020/0037046 A1   Jan. 30, 2020

Related U.S. Application Data

(62) Division of application No. 14/686,584, filed on Apr. 14, 2015, now Pat. No. 10,375,452.

(51) Int. Cl.
*H04N 21/845* (2011.01)
*H04N 21/4402* (2011.01)
(Continued)

(52) U.S. Cl.
CPC ..... *H04N 21/8456* (2013.01); *H04L 65/4076* (2013.01); *H04L 65/4084* (2013.01);
(Continued)

(58) Field of Classification Search
CPC ....... H04N 21/8456; H04N 21/440218; H04N 21/8549; H04L 65/4076; H04L 65/4084; H04L 65/602; H04L 65/607; G11B 27/005
(Continued)

(56) References Cited

U.S. PATENT DOCUMENTS 4,195,351 A   3/1980   Barner et al.
6,636,238 B1  10/2003  Amir et al.
(Continued)

FOREIGN PATENT DOCUMENTS

CA   2941117 A1   9/2015
EP   3120565 A2   1/2017
(Continued)

OTHER PUBLICATIONS

"3rd Generation Partnership Project: Technical Specification Group Services and Systems Aspects: Transparent end-to-end Packet Switched Streaming Service (PSS): Protocols and Codes (Release 10)", 3GPP TS 26.234 V10.0.0, vol. 0, Mar. 1, 2011 (Mar. 1, 2011), XP055147875.
(Continued)

*Primary Examiner* — Helen Shibru
(74) *Attorney, Agent, or Firm* — Gazdzinski & Associates, PC

(57) ABSTRACT

Apparatus and methods for thumbnail generation. In one embodiment, a thumbnail stream is generated where one or more bits are assigned to key frames and minimizes the number of bits assigned to delta frames. Each key frame may be used to extract a still image for use in thumbnails during trick mode operation (e.g., fast forward, rewind, pause, or random seek operation). When the encoded video file is given to a Just in Time Packager (JITP), the JITP extracts the image files (via the key frames). Information regarding how to reference these files is stored in generated manifest file and may be reformatted by the JITP to fit the needs of the current product. In a variant, the JITP reformats the image files extracted from the encoded video for operation on a number of devices.

21 Claims, 17 Drawing Sheets

(51) Int. Cl.
  *H04L 29/06* (2006.01)
  *H04N 21/8549* (2011.01)
  *H04L 65/611* (2022.01)
  *H04L 65/612* (2022.01)
  *H04L 65/60* (2022.01)
  *G11B 27/00* (2006.01)

(52) U.S. Cl.
  CPC ......... *H04L 65/602* (2013.01); *H04L 65/607* (2013.01); *H04N 21/440218* (2013.01); *H04N 21/8549* (2013.01); *G11B 27/005* (2013.01)

(58) Field of Classification Search
  USPC ................................................ 386/201, 241
  See application file for complete search history.

(56) References Cited

U.S. PATENT DOCUMENTS

| | | | |
|---|---|---|---|
| 7,602,820 | B2 | 10/2009 | Helms et al. |
| 7,954,131 | B2 | 5/2011 | Cholas et al. |
| 8,484,511 | B2 | 7/2013 | Engel et al. |
| 8,520,850 | B2 | 8/2013 | Helms et al. |
| 8,621,540 | B2 | 12/2013 | Apsangi et al. |
| 8,660,181 | B2 | 2/2014 | Streater et al. |
| 8,713,623 | B2 | 4/2014 | Brooks |
| 8,799,943 | B1 | 8/2014 | Sherwin et al. |
| 8,813,124 | B2 | 8/2014 | Tidwell et al. |
| 8,826,347 | B1 | 9/2014 | Earle |
| 8,863,164 | B1 | 10/2014 | Mick et al. |
| 8,917,977 | B2 | 12/2014 | Hamada et al. |
| 8,924,580 | B2 | 12/2014 | Begen et al. |
| 8,930,979 | B2 | 1/2015 | Tidwell et al. |
| 8,997,136 | B2 | 3/2015 | Brooks et al. |
| 9,066,115 | B1 | 6/2015 | Cherry et al. |
| 9,066,138 | B1 | 6/2015 | Kraiman et al. |
| 9,083,513 | B2 | 7/2015 | Helms et al. |
| 9,170,700 | B2* | 10/2015 | Kaiser .................... G06F 3/048 |
| 9,215,423 | B2 | 12/2015 | Kimble et al. |
| 9,247,317 | B2 | 1/2016 | Shivadas et al. |
| 9,674,266 | B2 | 6/2017 | Andersson et al. |
| 9,710,469 | B2 | 7/2017 | Chen et al. |
| 10,375,452 | B2 | 8/2019 | Hardin et al. |
| 11,089,373 | B2* | 8/2021 | Chittella ............ H04N 21/6587 |
| 2002/0135621 | A1 | 9/2002 | Angiulo et al. |
| 2002/0164149 | A1 | 11/2002 | Wilkinson |
| 2003/0028505 | A1 | 2/2003 | O'Rourke et al. |
| 2003/0056217 | A1 | 3/2003 | Brooks |
| 2003/0071971 | A1 | 4/2003 | Jo |
| 2004/0081333 | A1 | 4/2004 | Grab |
| 2005/0123381 | A1 | 6/2005 | Weeden et al. |
| 2005/0210145 | A1* | 9/2005 | Kim .................... H04N 21/4882 709/231 |
| 2005/0262529 | A1 | 11/2005 | Neogi et al. |
| 2006/0025869 | A1 | 2/2006 | Virdi et al. |
| 2006/0130113 | A1 | 6/2006 | Carlucci et al. |
| 2006/0161563 | A1 | 7/2006 | Besbris et al. |
| 2007/0058926 | A1 | 3/2007 | Virdi et al. |
| 2007/0136742 | A1 | 6/2007 | Sparrell |
| 2007/0147389 | A1 | 7/2007 | Qing et al. |
| 2007/0237225 | A1 | 10/2007 | Luo et al. |
| 2007/0253699 | A1* | 11/2007 | Yen .................... G06K 9/00664 396/311 |
| 2008/0015999 | A1 | 1/2008 | Ali et al. |
| 2008/0016196 | A1 | 1/2008 | MacMillan et al. |
| 2008/0077866 | A1* | 3/2008 | Margulis ................ G11B 27/34 715/723 |
| 2008/0104644 | A1 | 5/2008 | Sato et al. |
| 2008/0168133 | A1 | 7/2008 | Osborne |
| 2008/0181575 | A1 | 7/2008 | Girard et al. |
| 2008/0205644 | A1 | 8/2008 | Lee et al. |
| 2008/0235351 | A1 | 9/2008 | Banga et al. |
| 2008/0235746 | A1 | 9/2008 | Peters et al. |
| 2008/0276173 | A1* | 11/2008 | Li .................... H04N 7/17327 715/716 |
| 2008/0313691 | A1 | 12/2008 | Cholas et al. |
| 2009/0052870 | A1 | 2/2009 | Marsh et al. |
| 2009/0079840 | A1* | 3/2009 | Gandhi ................ H04N 9/8042 348/222.1 |
| 2009/0150557 | A1 | 6/2009 | Wormley et al. |
| 2009/0165067 | A1 | 6/2009 | Bruckman et al. |
| 2009/0190652 | A1 | 7/2009 | Kim et al. |
| 2010/0175088 | A1 | 7/2010 | Loebig et al. |
| 2010/0251304 | A1 | 9/2010 | Donoghue et al. |
| 2010/0251305 | A1 | 9/2010 | Kimble et al. |
| 2011/0016482 | A1 | 1/2011 | Tidwell et al. |
| 2011/0050860 | A1* | 3/2011 | Watson ................ H04N 13/341 348/51 |
| 2011/0067049 | A1 | 3/2011 | Piepenbrink et al. |
| 2011/0080940 | A1 | 4/2011 | Bocharov et al. |
| 2011/0103374 | A1 | 5/2011 | Lajoie et al. |
| 2011/0110515 | A1 | 5/2011 | Tidwell et al. |
| 2011/0138019 | A1 | 6/2011 | Bae |
| 2011/0283311 | A1 | 11/2011 | Luong |
| 2012/0011225 | A1 | 1/2012 | Keum et al. |
| 2012/0030314 | A1 | 2/2012 | Kim et al. |
| 2012/0030723 | A1 | 2/2012 | Baum et al. |
| 2012/0047542 | A1 | 2/2012 | Lewis et al. |
| 2012/0159542 | A1 | 6/2012 | Minwalla |
| 2012/0173751 | A1 | 7/2012 | Braness et al. |
| 2012/0179834 | A1 | 7/2012 | Van Der Schaar et al. |
| 2012/0185905 | A1 | 7/2012 | Kelley et al. |
| 2012/0198492 | A1 | 8/2012 | Dhruv et al. |
| 2012/0210216 | A1* | 8/2012 | Hurst .................... H04N 5/783 715/716 |
| 2012/0284747 | A1 | 11/2012 | Joao |
| 2013/0019273 | A1 | 1/2013 | Ma et al. |
| 2013/0046849 | A1 | 2/2013 | Wolf et al. |
| 2013/0060958 | A1 | 3/2013 | Keum et al. |
| 2013/0061045 | A1 | 3/2013 | Kiefer et al. |
| 2013/0067052 | A1 | 3/2013 | Reynolds et al. |
| 2013/0104162 | A1 | 4/2013 | Helms et al. |
| 2013/0111517 | A1 | 5/2013 | Dillon et al. |
| 2013/0276022 | A1 | 10/2013 | Tidwell |
| 2013/0282876 | A1 | 10/2013 | Watanabe et al. |
| 2013/0318629 | A1 | 11/2013 | Lajoie et al. |
| 2014/0040026 | A1 | 2/2014 | Swaminathan et al. |
| 2014/0108585 | A1 | 4/2014 | Barton et al. |
| 2014/0164760 | A1 | 6/2014 | Hybertson et al. |
| 2014/0189743 | A1 | 7/2014 | Kennedy et al. |
| 2014/0230003 | A1 | 8/2014 | Ma et al. |
| 2014/0237520 | A1* | 8/2014 | Rothschild ....... H04N 21/23406 725/88 |
| 2014/0245346 | A1 | 8/2014 | Cheng et al. |
| 2014/0355624 | A1 | 12/2014 | Li et al. |
| 2015/0006752 | A1 | 1/2015 | O'Hare et al. |
| 2015/0089557 | A1 | 3/2015 | Busse et al. |
| 2015/0095460 | A1 | 4/2015 | Berger et al. |
| 2015/0095511 | A1 | 4/2015 | McGowan et al. |
| 2015/0127845 | A1 | 5/2015 | Phillips |
| 2015/0188974 | A1 | 7/2015 | Garcia-Mendoza Sanchez et al. |
| 2015/0256843 | A1* | 9/2015 | Roskowski ............ H04N 7/188 382/246 |
| 2015/0261600 | A1 | 9/2015 | Iturralde et al. |
| 2015/0271234 | A1 | 9/2015 | O'Malley et al. |
| 2015/0271541 | A1 | 9/2015 | Gonder et al. |
| 2015/0373385 | A1 | 12/2015 | Straub et al. |
| 2016/0103830 | A1 | 4/2016 | Cheong et al. |
| 2016/0164841 | A1 | 6/2016 | Mikhailov et al. |
| 2016/0165173 | A1 | 6/2016 | Lesh |
| 2016/0323617 | A1 | 11/2016 | Marchand |
| 2016/0330764 | A1* | 11/2016 | Kim .................... H04W 74/004 |
| 2017/0127298 | A1 | 5/2017 | Ryu et al. |
| 2017/0171766 | A1 | 6/2017 | Amizur |
| 2018/0014041 | A1 | 1/2018 | Chen et al. |
| 2019/0069004 | A1 | 2/2019 | Badawiyeh |
| 2019/0158906 | A1 | 5/2019 | Gonder et al. |
| 2020/0314461 | A1 | 10/2020 | Chen et al. |
| 2021/0281893 | A1 | 9/2021 | Badawiyeh |

(56) References Cited

U.S. PATENT DOCUMENTS

FOREIGN PATENT DOCUMENTS

| EP | 3687175 A1 | 7/2020 |
|---|---|---|
| JP | 2004054930 A | 2/2004 |
| JP | 2009519678 A | 5/2009 |
| JP | 2012527829 A | 11/2012 |
| JP | 2013524618 A | 6/2013 |
| JP | 2017519382 A | 7/2017 |
| JP | 2019208210 A | 12/2019 |
| WO | WO-2013058684 A1 | 4/2013 |
| WO | WO-2015142741 A2 | 9/2015 |

OTHER PUBLICATIONS

"IEEE Standard Protocol for Stream Management in Media Client Devices", IEEE Standard 2200-2012, United States, Aug. 9, 2012, pp. 1-196, XP068045676.
Ting H., et al. "Trick Play Schemes for Advanced Television Recording on Digital VCR," IEEE, 1995, pp. 1159-1168.
Zhangf G., et al., "Implementing Hierarchical Trick Play for HTTP Video Streaming", IEEE, 2010, pp. 465-468.
Zhu P., et al,. "Trick Play Function for VOD with SVC Source," IEEE, 2010, pp. 255-259.

\* cited by examiner

APPARATUS AND METHODS FOR THUMBNAIL GENERATION

PRIORITY AND RELATED APPLICATIONS

The present application is a divisional of and claims priority to co-owned U.S. patent application Ser. No. 14/686,584 filed on Apr. 14, 2015 of the same title, issuing as U.S. Pat. No. 10,375,452 on Aug. 6, 2019, which is incorporated herein by reference in its entirety.

Additionally, this application is generally related to the subject matter of co-owned and U.S. application Ser. No. 14/220,021 filed on Mar. 19, 2014 and entitled "APPARATUS AND METHODS FOR RECORDING A MEDIA STREAM" which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital media data (e.g., text, video, and/or audio) over data delivery networks, such as an Internet Protocol Television (IPTV) network, and/or the Internet; and specifically in one aspect to the generation of thumbnail information relating to the delivered data.

2. Description of Related Technology

Adaptive bitrate (ABR) streaming is a technique to distribute program content over a large distributed network. Multiple bitrates of a particular piece of content are available to stream to a viewer and the selection of the bit rate is based on current network conditions. This means that when there is greater bandwidth availability, a larger bitrate version of the content may be selected. If available bandwidth narrows, a lower bitrate (i.e., smaller) version of the content may be selected to provide a seamless user experience.

During playback of content whether through traditional digital video recorder (DVR) or network based delivery, a user is additionally provided with an ability to perform various trick mode functions including e.g., pause, rewind, fast forward, etc. These trick mode functions are available to streaming media and existing Video-on-Demand (VOD) solutions as well. One or more thumbnails are displayed to the user upon selection of a fast forward, rewind, pause, random seek command, or other trick mode button. The display of the thumbnails requires the creation of a large number of stand-alone image files which are referenced to particular positions within the content. For example, if a thumbnail needs to be generated for every two seconds of content on a particular platform for a movie lasting two hours, 3600 thumbnails would need to be generated and managed. This requires a large amount of storage and content management for the variety of image files required under the existing solution.

Based on the foregoing, it is clear that while prior art solutions have generally recognized the benefits of adaptive bitrate streaming and trick mode functionality, technical limitations pose a storage and content management problem on the networks that store the content. What is needed is methods and apparatus for enabling thumbnail generation during trick mode operation which does not tax the system storage and which are easily managed.

SUMMARY

The present disclosure addresses the foregoing needs by providing, inter alia, methods and apparatus for thumbnail generation for use in adaptive bitrate (ABR) streaming via extracting key frames from a thumbnail stream by a Just in Time Packager (JITP).

In a first aspect, an encoder apparatus is disclosed. In one embodiment, the apparatus comprising includes: a first interface configured to communicate with a network, a storage apparatus, and a processor configured to execute at least one computer program, the at least one computer program comprising a plurality of instructions. The instructions are configured to, when executed, cause the apparatus to encode a plurality of video files from a content source for use with adaptive bitrate streaming. The plurality of video files include a thumbnail stream comprising a first plurality of key frames separated by null frames, the thumbnail stream configured to have said first plurality of key frames extracted and be transmitted to a user device during a trick mode operation of the user device and at least one other encoded stream. The at least one other encoded stream comprising a second plurality of key frames separated by delta frames.

In another embodiment, the first plurality of key frames of the thumbnail stream and the second plurality of key frames of the at least one other encoded stream are synchronized. In another embodiment, the at least one other encoded stream comprises a plurality of streams each associated with a different bit rate configured for use with adaptive bit rate streaming. In a further embodiment, the thumbnail stream and each stream of the at least one other encoded stream are packaged in separate transport stream files. In an additional embodiment, the at least one other encoded stream comprise an audio track.

In a second aspect, a packager apparatus is disclosed. In one embodiment, the packager apparatus comprises: a first interface configured to communicate with a content delivery network, a storage apparatus, and a processor configured to execute at least one computer program, the at least one computer program comprising a plurality of instructions. The instructions are configured to, when executed, cause the apparatus to: based on a user request, extract a plurality of thumbnail images configured for use during trick mode operation of a user device from a plurality of key frames in a thumbnail stream, the thumbnail stream comprising said first plurality of key frames separated by null frames and based, at least in part, on the user request and the extraction of the plurality of thumbnail images, generate a manifest file comprising a plurality of addresses corresponding to a location of the plurality of thumbnail images.

In another embodiment, the plurality of instructions are further configured to, when executed, cause the apparatus to segment portions of an encoded stream for delivery via the content delivery network. The generated manifest file further comprises a second plurality of addresses corresponding to the plurality of segmented portions of the encoded stream. The extraction of the plurality of thumbnail images comprises skipping the null frames in the thumbnail stream. In another embodiment, the extraction of the plurality of thumbnail images is based, at least in part, on a user request for the thumbnail images. In a further embodiment, the generation of the manifest file is based on a device type of a requesting device. In an additional embodiment, the plurality of instructions are further configured to, when executed, cause the apparatus to remove the extracted plurality of thumbnail images. In another embodiment the plurality of instructions are further configured to, when executed, cause the apparatus to resize the extracted plurality of thumbnail images based, at least in part, on a device type of a requesting device.

In a third aspect, a method for providing images for display during trick mode operation is disclosed. In one embodiment, the method comprises receiving a plurality of encoded files, receiving a request from a user device for thumbnail images associated with said source file. Based, at least in part, on the receipt of the request, the method includes: extracting a plurality of thumbnail images from the first plurality of key frames in the thumbnail stream, generating a manifest file comprising addresses of the extracted plurality of thumbnail images, and providing the manifest file to the user device. The plurality of encoded files include a thumbnail stream, said thumbnail stream comprising a first plurality of key frames separated by null frames and comprising no delta frames and a video stream, said video stream comprising a second plurality of key frames separated by delta frames, where said first plurality of key frames and said second plurality of key frames are synchronized.

In another embodiment, the method also includes receiving a second request from the user device for the video stream of the source file and based, at least in part, on receiving the second request, segmenting the video stream of the source file into a plurality of segments wherein the manifest file further comprises addresses of the plurality of segments. In another embodiment, the key frames comprise I-frames and the delta frames comprise B-frames. In a further embodiment, the method further includes resizing each of the extracted plurality of thumbnail images. Additionally the resizing is based, at least in part on a device type of the request. Additionally, in an embodiment the method includes serving at least one of the plurality of thumbnail images to the user device. In a further embodiment, the method also includes deleting the plurality of thumbnail images based, at least in part, on a termination of a session with the user device.

In a fourth aspect, a consumer premises equipment (CPE) is disclosed.

In a fifth aspect, a computer readable medium is disclosed. In one embodiment, the computer readable medium comprises one or more instructions, which when executed by the processor, are configured to cause a device to perform a variety of functions. In a further embodiment, the computer readable medium is non-transitory.

In a sixth aspect, image recognition, automatic box-art generation, search optimization features, and quality of service checking/correcting are disclosed.

These and other aspects shall become apparent when considered in light of the disclosure provided herein.

Figure 1:
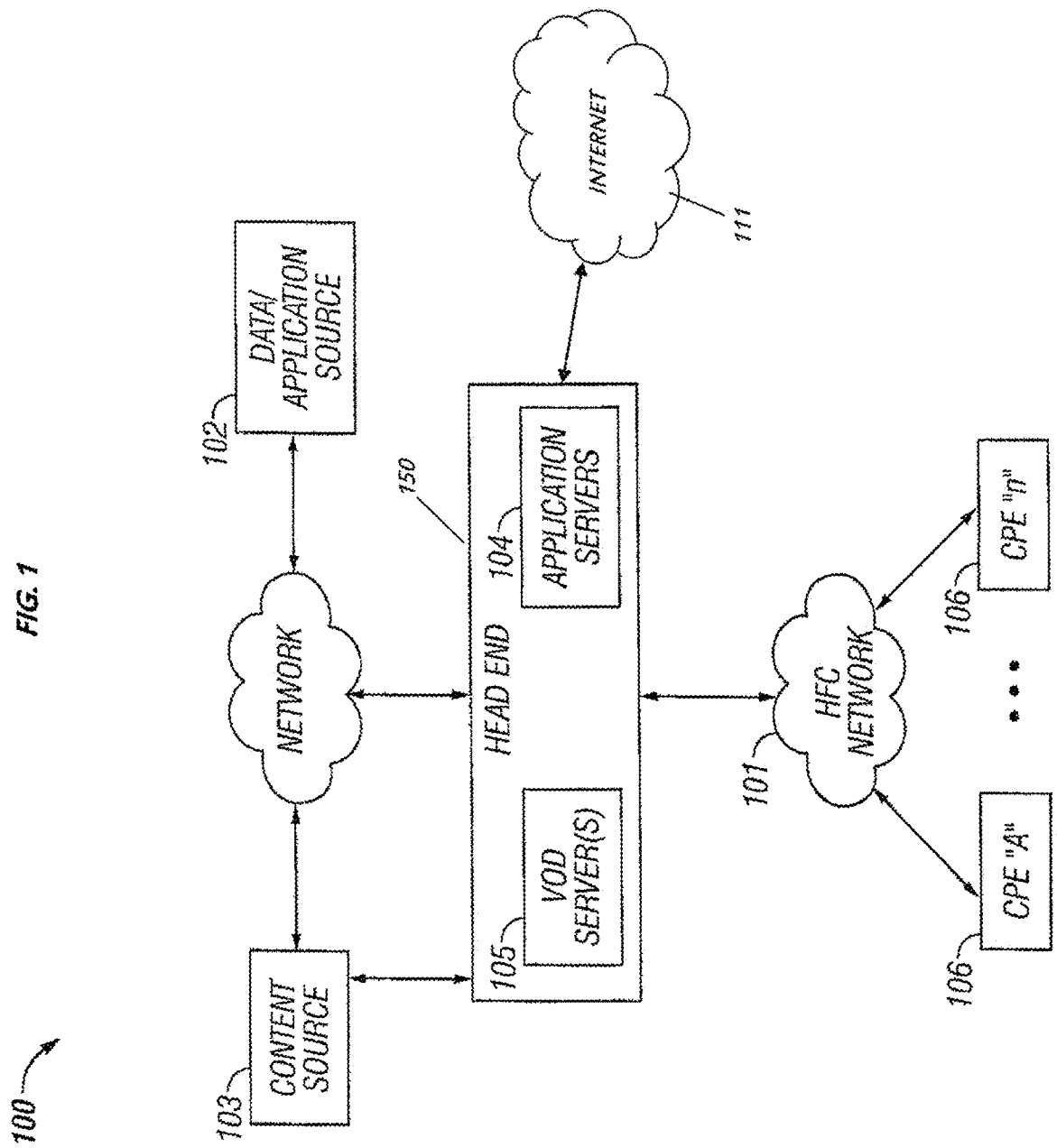
FIG. 1 is a functional block diagram illustrating an exemplary hybrid fiber network configuration useful with various aspects of the present disclosure.

All figures © Copyright 2015 Time Warner Enterprises LLC All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect, a server that generates thumbnail information for a plurality of video files is disclosed. In one exemplary embodiment, the thumbnails are generated by first generating a video file which assigns a majority of its bits to the key frame (e.g., intra-coded frame (I-frame)), and which minimizes the number of bits which are assigned to "delta frames" (e.g., forward predicted (P)- and bidirectionally predicted (B)-frames). The video file is encoded along with other Adaptive Bitrate (ABR) files. This allows for precise timing between "playback time code" and the thumbnail display time. A still frame is then extracted from each key frame for use as a thumbnail during trick mode operation (e.g., fast forward, rewind, pause, or random seek operation). When the encoded video file is given to a Just in Time Packager (JITP), the JITP extracts the image files (via the key frames) to be used as thumbnails. Upon registration of a user, a JITP generates a manifest file listing all components for playback. These components, including the timecode and "playback" location for all thumbnail files are included. Information regarding a naming convention and/or how to reference these files is stored in a master manifest file and may be reformatted by the JITP to fit the needs of any device which requires the file. In a variant, the JITP reformats the image files extracted from the encoded video for operation on a number of devices (e.g., a variety of resolutions, frame rates, picture encodings, and color spaces, etc.).

In another embodiment, when a user enters a trick mode function (e.g., fast forward, rewind, pause, stop, random seek, etc.), the player uses the manifest file to begin making calls for each image in order to display thumbnail images to the user to browse through the content. If this is the first request, the content delivery network will request the images from the JITP, and the JITP extracts the images, reformats the images, and provides the images to the requesting player via the content delivery network. The image may be viewed as a standard web file from a cache of images at the user device.

In a further embodiment, additional services may utilize the thumbnail stream and/or the JITP for image recognition (and associated advertising), automatic box art generation, search engine optimization (SEO), and quality of service (QoS) and error checking and correcting. These services may be performed in real-time because much of the pre-processing associated with the images has been performed in advance (by e.g., the encoder) via the creation of the thumbnail stream and/or real time extraction of thumbnails by the JITP.

Various other operational and/or business-related rules are disclosed.

In addition, content protection schemes may be advantageously deployed at e.g., the gateway, the client device, and/or one or more network entities, consistent with the various aspects disclosed herein.

Detailed Description of Exemplary Embodiments

Exemplary embodiments of the apparatus and methods of the present disclosure are now described in detail. While these exemplary embodiments are described in the context of the previously mentioned hybrid fiber coax (HFC) cable architecture having a multiple systems operator (MSO), digital networking capability, IP delivery capability, and a plurality of client devices/CPE, the general principles and advantages of the disclosure may be extended to other types of networks and architectures that are configured to deliver digital media data (e.g., text, video, and/or audio). Such other networks or architectures may be broadband, narrowband, wired or wireless, or otherwise.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

It is further noted that while exemplary embodiments are described primarily in the context of a cable system with 6 MHz RF channels, the present disclosure is applicable to literally any network topology or paradigm, and any frequency/bandwidth or transport modality.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Bearer Network

FIG. 1 illustrates a typical content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1*a* (described in greater detail below), or others, may be used.

The data/application origination point 102 comprises any medium that allows data and/or applications (such as a VOD-based or "Watch TV" application) to be transferred to a distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications enter the network system. Distribution servers are well known in the networking arts, and accordingly not described further herein.

The VOD server 105 comprises a computer system where on-demand content is received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that may be accessed by a distribution server 104.

The VOD server 105 and application distribution servers 104 are a part of the headend architecture of the network 100. The headend 150 is connected to an internetwork (e.g., the Internet) 111.

Figure 1A:
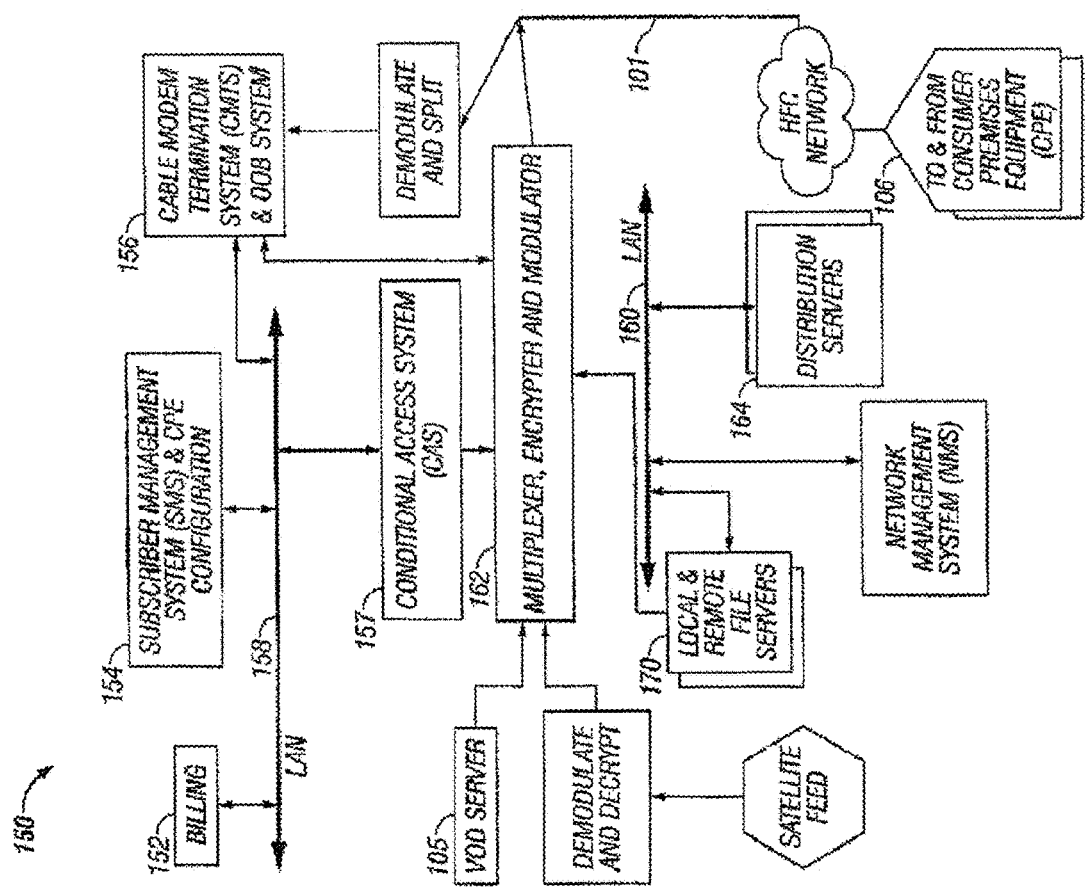
FIG. 1a is a functional block diagram illustrating one exemplary network headend configuration.

Referring now to FIG. 1*a*, one exemplary embodiment of a headend architecture is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
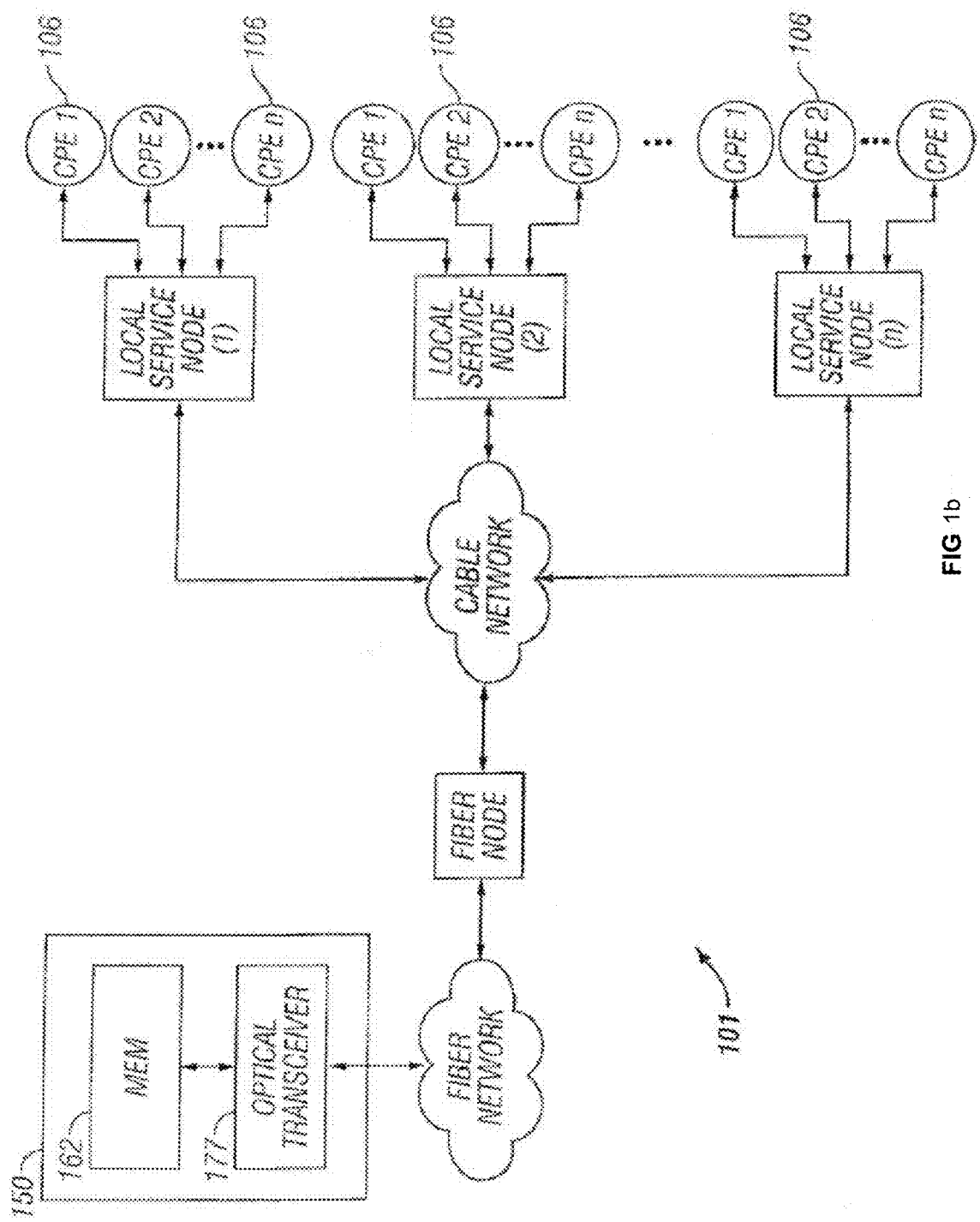
FIG. 1b is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
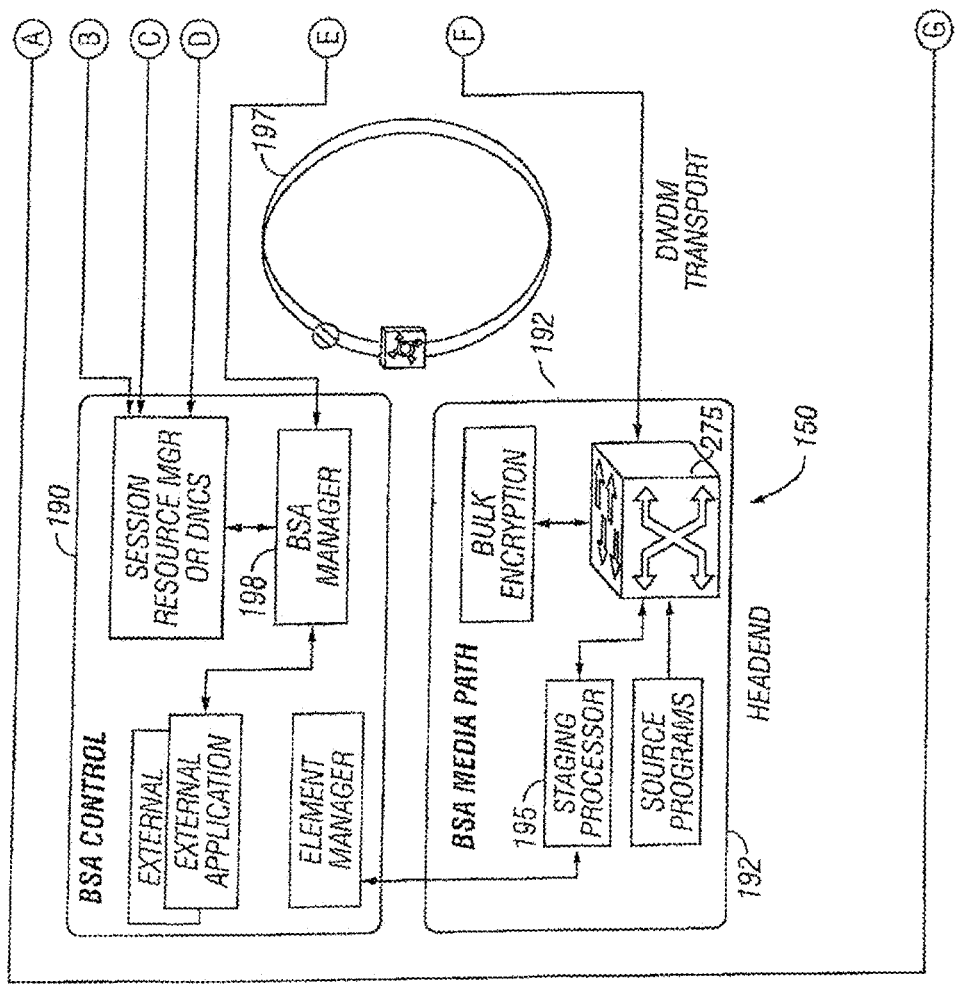
FIG. 1c is a functional block diagram illustrating one exemplary broadcast switched architecture (BSA) network.
Figure 1C:
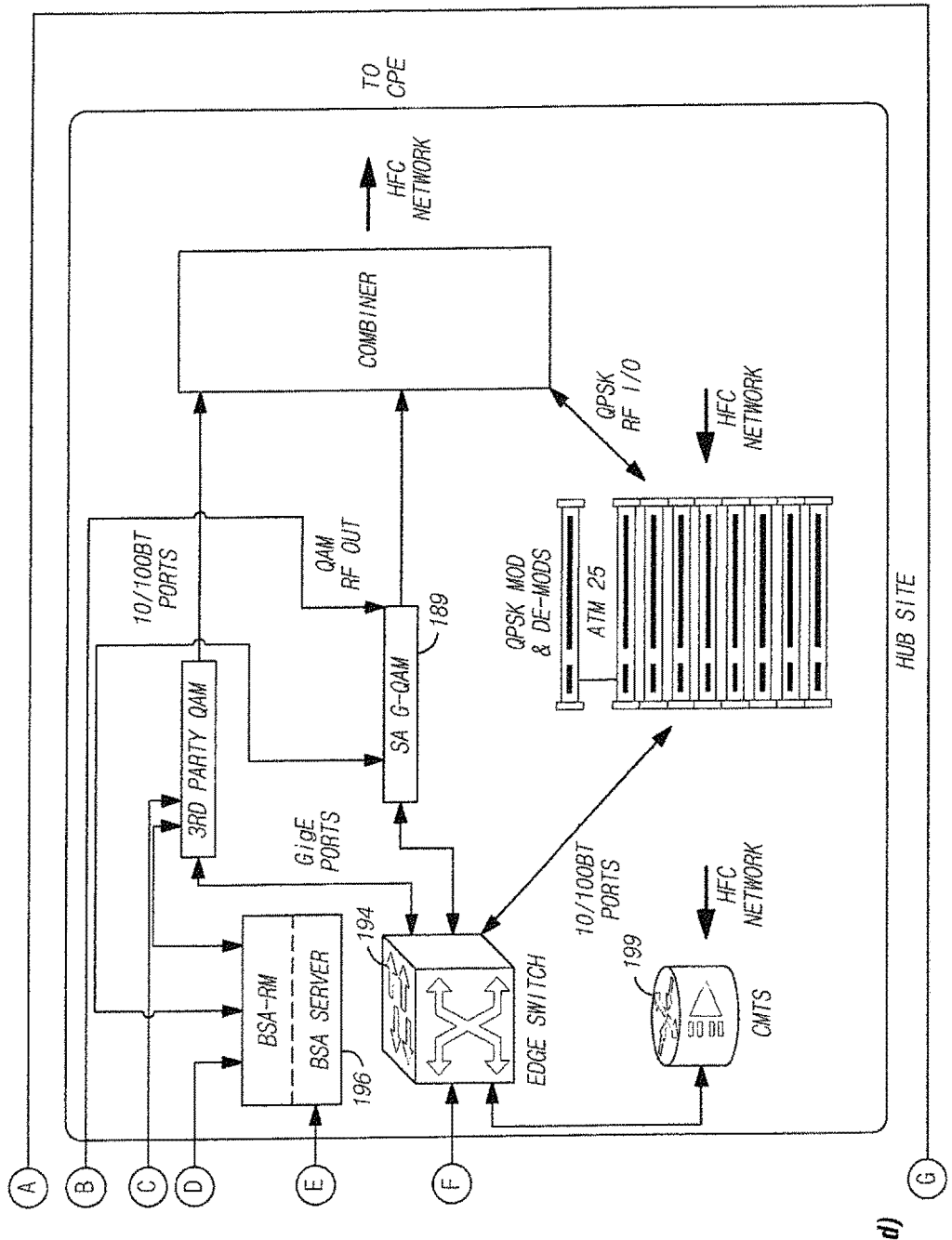

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach may be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks

FIG. 1c illustrates an exemplary "switched" network architecture. While a so-called "broadcast switched architecture" or BSA network is illustrated in this exemplary network architecture embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. Patent Application Publication No. 2003/0056217 filed on Sep. 20, 2001 and entitled "TECHNIQUE FOR EFFECTIVELY PROVIDING PROGRAM MATERIAL IN A CABLE TELEVISION SYSTEM", issued as U.S. Pat. No. 8,713,623 on Apr. 29, 2014, and incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized Networks"

Figure 1D:
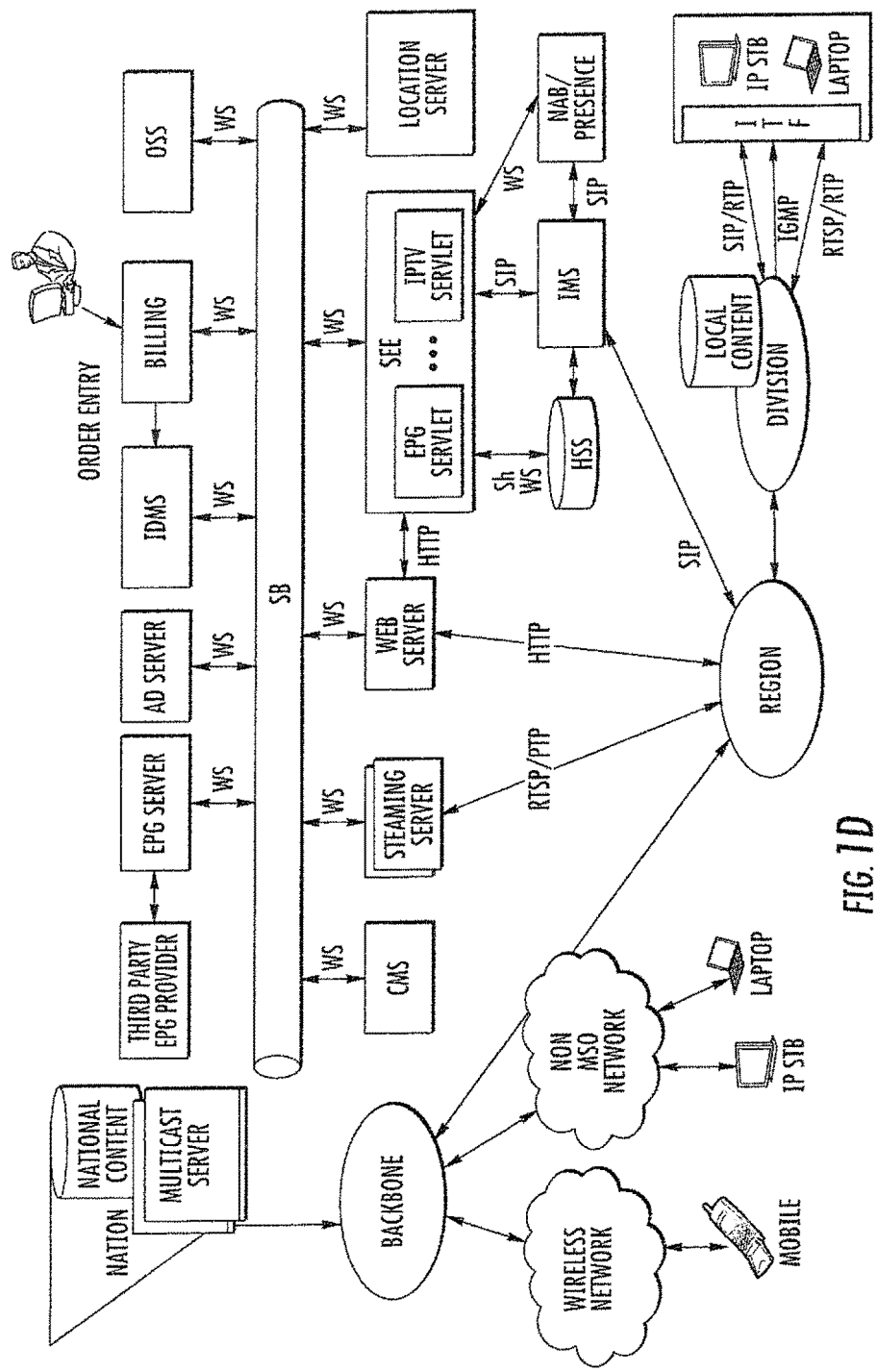
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Figure 1E:
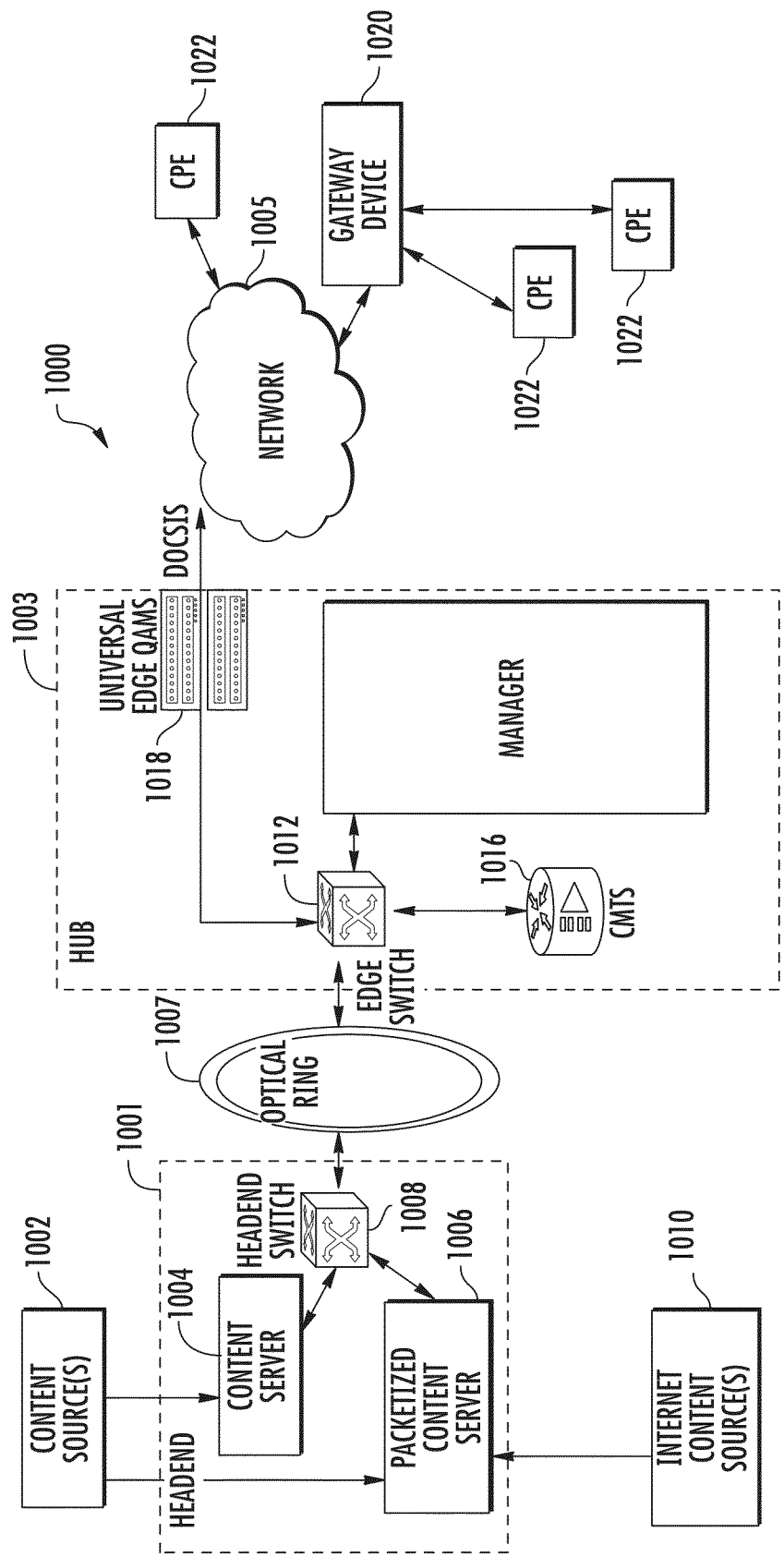
FIG. 1e is a functional block diagram illustrating a second exemplary packetized content delivery network architecture useful with various aspects of the present disclosure.

Referring now to FIG. 1e, another exemplary network architecture for the delivery of packetized content disclosure useful with the present disclosure. In addition to on-demand and broadcast content (e.g., video programming), the system of FIG. 1e may deliver Internet data services using the Internet protocol (IP), although other protocols and transport mechanisms of the type well known in the digital communication art may be substituted.

The network 1000 generally comprises a local headend 1001 in communication with at least one hub 1003 via an optical ring 1007. The distribution hub 1003 is able to provide content to various user devices, CPE 1022, and gateway devices 1020, via a network 1005.

Various content sources 1002 are used to provide content to a content server 1004. For example, content may be received from a local, regional, or network content library as discussed in co-owned U.S. patent application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", issued as U.S. Pat. No. 8,997,136 on Mar. 31, 2015, which is incorporated herein by reference in its entirety. Alternatively, content may be received from linear analog or digital feeds, as well as third party content sources. Internet content sources 1010 (such as e.g., a web server) provide internet content to a packetized content server 1006. Other IP content may also be received at the packetized content server 1006, such as voice over IP (VoIP) and/or IPTV content. Content may also be received from subscriber and non-subscriber devices (e.g., a PC or smartphone-originated user made video). In one embodiment, the functionality of both the content server 1004 and packetized content server 1006 may be integrated into a single server entity.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 1e, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, HFCu, etc. subscriber CPE-based session requests, while a different configuration or architecture may be used for servicing mobile client requests. Similarly, the content servers 1004, 1006 may either be single-purpose/dedicated (e.g., where a given server is dedicated only to servicing certain types of requests), or alternatively multi-purpose (e.g., where a given server is capable of servicing requests from different sources).

The network 1000 of FIG. 1e may further include a legacy multiplexer/encrypter/modulator (MEM; not shown) coupled to the network 1005 adapted to "condition" content for transmission over the network. In the present context, the content server 1004 and packetized content server 1006 may be coupled to the aforementioned LAN, thereby providing access to the MEM and network 1005 via one or more file servers (not shown). The content server 1004 and packetized content server 1006 are coupled via the LAN to a headend switching device 1008 such as an 802.3z Gigabit Ethernet (or incipient "10G") device. Video and audio content is multiplexed at the headend 1001 and transmitted to the edge switch device 1012 (which may also comprise an 802.3z Gigabit Ethernet device).

In one exemplary delivery paradigm MPEG-based video content may be delivered, with the video transported to user PCs (or IP-based CPE) over the relevant transport (e.g., DOCSIS channels) comprising MPEG (or other video codec such as H.264 or AVC) over IP over MPEG. That is, the higher layer MPEG- or other encoded content may be encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

Individual CPEs 1022 of the implementation of FIG. 1e may be configured to monitor the particular assigned RF channel (such as via a port or socket ID/address, or other such mechanism) for IP packets intended for the subscriber premises/address that they serve.

In the switched digital variant, the IP packets associated with Internet services are received by edge switch, and forwarded to the cable modem termination system (CMTS) 1016. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the CPE. The IP packets are typically transmitted on RF channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 (described subsequently herein) and distributed to one or more CPE 1022 in communication therewith. Alternatively, the CPE 1022 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set top box (DSTB) or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

In the embodiment illustrated in FIG. 1e, IP packetized content is provided to various user devices via the network 1005. For example, content may be delivered to a gateway apparatus 1020 which distributes content received thereat to one or more CPE 1022 in communication with the apparatus 1020.

In another variant, elements in both the headend and CPE 1022 are specially adapted to utilize transmission infrastructure to transmit and receive both multiplexed wideband content and legacy content as is described in co-owned, U.S. patent application Ser. No. 11/013,671 filed on Dec. 15, 2004 and entitled "METHOD AND APPARATUS FOR WIDEBAND DISTRIBUTION OF CONTENT", issued as U.S. Pat. No. 9,723,267 on Aug. 1, 2017, which is incorporated by referenced herein in its entirety. As discussed therein, the CPE 1022 or gateway 1020 of this embodiment may be configured to contain multiple tuners (or a single wide-band tuner) which allow the device to receive the signals from all of the relevant physical carriers simultaneously. The carriers are demodulated, and channel-based decryption and basic demultiplexing (recombination) is performed. If multiplexed, the streams are then delivered to a transport demultiplexer which demultiplexes all of the streams resident within the statistical multiplex.

Methods and apparatus for the switched delivery of content may also be utilized consistent with the present disclosure. For example, only that content for which there is at least one request from a user device may be provided. In one embodiment, the methods and apparatus disclosed in co-owned U.S. patent application Ser. No. 09/956,688 entitled "TECHNIQUE FOR EFFECTIVELY PROVIDING PROGRAM MATERIAL IN A CABLE TELEVISION SYSTEM" and filed on Sep. 20, 2001, and issued as U.S. Pat. No. 8,713,623 on Apr. 29, 2014, which is incorporated herein by reference in its entirety, may be utilized for providing "switched" delivery of the IP content. For example, a mechanism may be employed whereby the delivery of a session is based at least in part on logic to determine whether any users for the session are active; e.g., a multicast with no remaining "viewers" (or session participants) may be collapsed, and the bandwidth reclaimed.

In another variant, IP simulcast content and existing on-demand, voice, and broadcast content are all provided to the headend switch device 1008 of FIG. 1e. The headend switch 1008 then provides the content to the optical ring 1007 for provision to one or more distribution hubs 1003. IP simulcast content is in one exemplary implementation retrieved from a plurality of content sources at an IPTV server.

The IP-packet content is transmitted to subscriber devices via the universal edge QAM 1018 and the edge network 1005. The IP video ("simulcast") content is presented to client devices capable of receiving content over the DOCSIS QAMs. For example, the aforementioned gateway device 1020 (as well as an advanced CPE 1022 such as an IP-enabled DSTB may receive the IP simulcast. Legacy CPE may receive content via the gateway device 1020, or via an audio/video "back-up" MPEG transport stream as previously described.

It is further appreciated that content may be delivered to various Worldwide Interoperability for Microwave Access (WiMAX)-enabled mobile devices (e.g., PMD or non-legacy CPE) via a WiMAX distribution hub of the type now ubiquitous in the wireless arts. WiMAX is a wireless technology that provides high-throughput broadband connections over longer distances (as compared to short-range technologies such as WLAN, Bluetooth or PAN). WiMAX can be used for a number of applications, including "last mile" broadband connections, cellular backhaul, hotspot coverage, and high-speed enterprise connectivity, as well as broadband delivery to mobile devices.

Moreover, the aforementioned WiMAX technology may be used in conjunction with a WiMAX-enabled gateway (not shown) or CPE, such that content is delivered wirelessly to the gateway or CPE from the distribution hub, irrespective of the indigenous wired or optical distribution network infrastructure.

In the illustrated embodiment, the gateway device 1020 serves as a gateway to the IP content for other client devices (such as other CPE 1022 and PMD). The gateway device 1020 may communicate with one or more connected CPE 1022, as well as utilize Wi-Fi capabilities (where so equipped) to communicate wirelessly to other devices. It will also be recognized that the present disclosure may be configured with one or more short-range wireless links such as Bluetooth for lower bandwidth applications (or UWB/PAN for greater bandwidth applications).

In another embodiment, content received at a first user CPE 1022 may be transmitted to CPE 1022 of other premises in a peer-to-peer (P2P) fashion. For example, first content may be requested and received at a first CPE 1022. Then, when a second CPE 1022 in the same region or division requests the same content, the request may be examined by a headend entity (not shown), or the gateway 1020 acting as a peer proxy, to determine that the requesting second device CPE 1022 is entitled to receive the content and that the content is available at the first CPE 1022. The headend entity directs a peer-to-peer communication to be established between the authorized second CPE 1022 and the CPE 1022 having the requested content. It is appreciated that while described herein in the context of a single CPE 1022 providing content to a second CPE 1022, several CPE 1022 having the content thereon may be contacted for simultaneous delivery of the content to one or more second CPE 1022. In one such implementation, the peer-to-peer communication methods and apparatus disclosed in co-owned U.S. patent application Ser. No. 11/726,095 entitled "METHODS AND APPARATUS FOR CONTENT DELIVERY AND REPLACEMENT IN A NETWORK" filed Mar. 20, 2007, which is incorporated herein by reference in its entirety, may be utilized in conjunction with the present disclosure. As discussed therein, these P2P methods and apparatus also advantageously improve the "robustness" or capability of the network with respect to ensuring that subscribers or other users can receive and access desired content when they want, as well as seamlessly repairing or reconstituting damaged or missed portions of that content (including even an entire streamed program, broadcast or download).

It is still further appreciated that the delivery of content may include delivery from an "off-net" distribution hub (not shown) to another network (not shown), not associated with the MSO. In this embodiment, a requesting device (such as CPE 1022 or gateway 1020) may request content from a local headend 1001 which is transferred over both MSO-maintained ("on-net") and "off-net" networks advantageously.

Packetized Content Delivery Network Architecture for Recording Media

Figure 2:
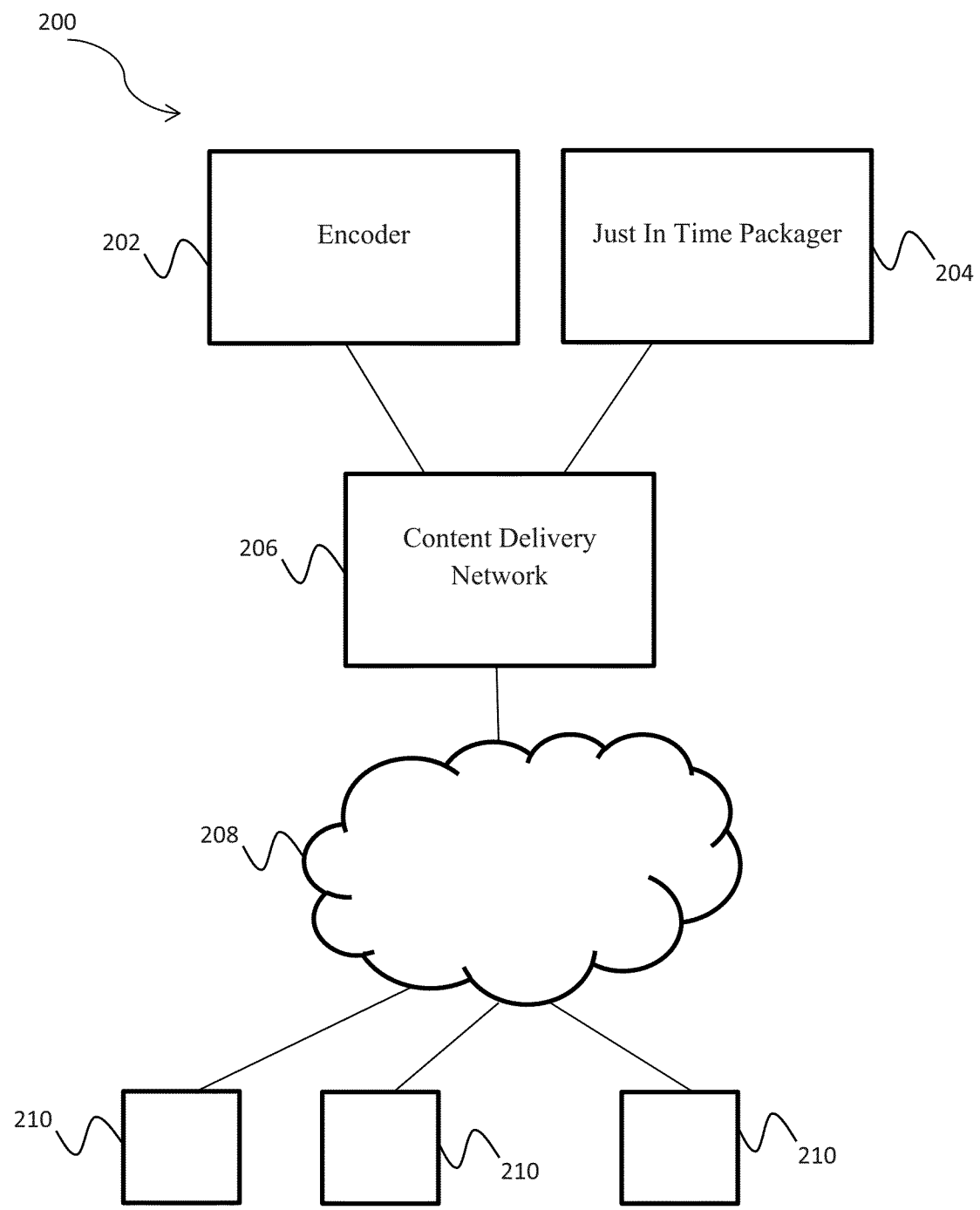
FIG. 2 is a functional block diagram of an exemplary network useful in conjunction with various principles described herein.

Referring now to FIG. 2, an exemplary configuration of a network useful with the present disclosure is illustrated. While described in the context of an Internet Protocol network, it will be recognized that the principles of the disclosure may be extended to other transport modalities and network paradigms.

FIG. 2 discloses an exemplary configuration of an architecture 200 for providing video content to users 210 via a content delivery network (CDN) 206. The CDN 206 is in communication with users 210 via the network 208. In one embodiment of the present disclosure, the network 208 comprises an internet, such as e.g., the Internet. As shown, the CDN 206 is in communication with an encoder 202 and a Just in Time Packager (JITP) 204. In one embodiment of the present disclosure, the encoder 202 encodes a source file into at least one further encoding format (e.g., transcodes a source file from one format to at least one other format). In another variant, the source file is encoded into a plurality of encodings that correspond to a respective plurality of one or more device types, codecs, resolutions, file formats, audio encodings, bit rates, etc. The variety of encodings may be utilized by the CDN 206 (and the JITP 204) via adaptive bitrate (ABR) streaming.

"Adaptive bitrate (ABR) streaming" refers to streaming multimedia over computer networks such that a source file thereof is encoded into multiple bitrates. Encoded content segments (or chunks) of varying bit rates are sent to a user. Non-limiting examples of ABR streaming include, without limitation, MPEG-Dynamic Adaptive Streaming over HTTP (DASH), Adobe® Dynamic Streaming for flash, Apple® HTTP Adaptive Streaming, Microsoft® Smooth Streaming, QuavStreams® Adaptive Streaming over HTTP, and upLynk®.

The encoder 202 produces a thumbnail stream from which thumbnail images are extracted for use in trick mode operation (e.g., fast forward, rewind, pause, and/or random seek) when viewing the content. The JITP 204 extracts the thumbnails from the key frames of the video track. The JITP 204 then provides the extracted thumbnails to the CDN 206, which in turn provides them to a requesting user 210.

The requesting device 210 may include home gateway devices and/or media client devices. In one embodiment a media client device is a portable device. Common examples of portable devices include, without limitation, tablets, phablets, smart phones, smart televisions (TVs), desktop and laptop personal computers (PC), and portable media players. In another embodiment, the media client device may comprise a file server; file servers are common in both commercial and residential use. For example, a subscriber may have a PC which can play media files, but which also serves his/her other consumer electronics (e.g., smart phone and tablet).

In yet another embodiment, the functionality of both the encoder 202 and the JITP 204 may be integrated into a single apparatus. In a still further embodiment, the encoder 202 and the JITP 204 may be combined with the CDN 206 into a single apparatus. Additionally, the encoder 202 can, in another variant, feed data directly to the JITP 204, or may operate separately from the JITP 204. Thus, each of the CDN 206, encoder 202, and JITP 204 may be housed in a separate server apparatus, may comprise different processes running on a single server apparatus, or may comprise any number of distributed applications with functionality across any number of apparatus. Each server apparatus 202, 204, and 206 may include memory and storage, one or more processors, and interfaces to connect to other components/networks as shown in FIG. 2.

Encoder

Figure 3A:
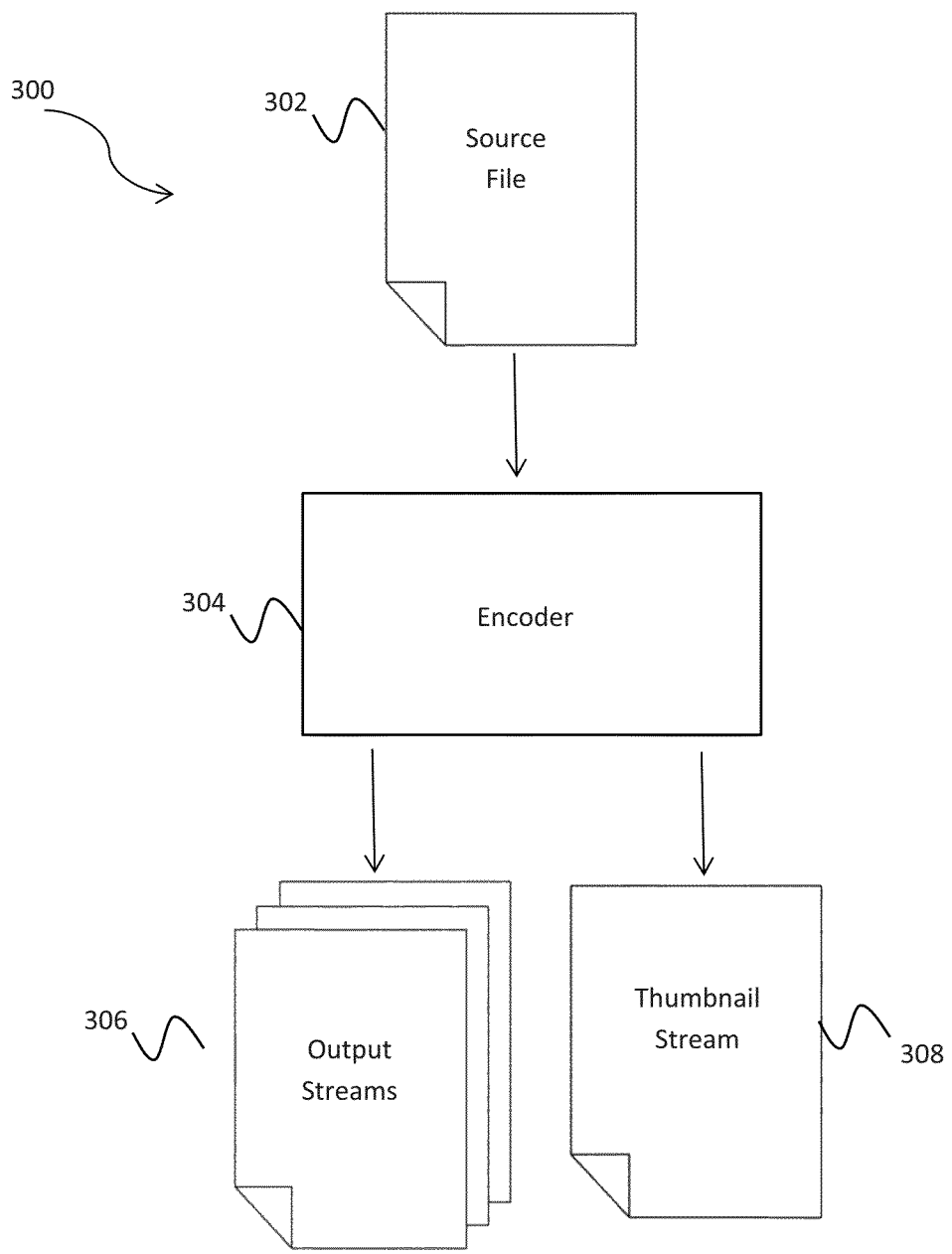
FIG. 3a is a simplified input/output diagram of an encoder useful in conjunction with various principles described herein.

Referring now to FIG. 3a, a simplified input/output diagram 300 of an encoder 202 is illustrated. A source file 302 is an input to the encoder 202. The source file may be encoded in a variety of formats (both audio and video), bit rates, resolutions, which are each playable on a variety of devices. Accordingly, one or more output streams 306 are produced by the encoder 202. For example, a content delivery network may enable a wide variety of user devices to play a certain piece of content. Accordingly, a network operator selects to have the encoder 202 encode the content into multiple formats for use on the variety of players. In a further embodiment, a network operator selects to utilize adaptive bitrate streaming such that multiple bit rate streams are utilized by selecting an optimized stream 306, e.g., the stream 306 that best utilizes the viewer's device and current bandwidth constraints to provide an optimal playback experience. The optimization occurs via a process or application running at the encoder 202.

As noted previously, various content sources may provide source files 302 to the encoder 202. For example, content may be received from a local, regional, or network content library as discussed in co-owned U.S. application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", issued as U.S. Pat. No. 8,997,136 on Mar. 31, 2015, which is incorporated herein by reference in its entirety. Alternatively, content may be received from linear analog or digital feeds, as well as third party content sources. Internet content sources (such as e.g., a web server) may also provide Internet content to the encoder 202. In yet another embodiment, content may be received from subscriber and/or non-subscriber devices (e.g., a PC or smartphone-originated user made video).

Parameters used by the encoder 202 to encode the source file 302 include: (i) whether an output should include an audio only track, or a thumbnail track with audio included, (ii) whether the streams should be encrypted and via which encryption format (e.g., AES, DES, public key encryption, etc.), (iii) an appropriate key frame period, (iv) a frame rate, (v) segmentation duration, (vi) video resolutions, (vii) video bitrate, (viii) audio bit rate (where necessary), (ix) audio sample rate, (x) a number of audio channels, (xi) aspect ratio, (xii) video codec, (xiii) specific device profiles, (xiv) audio volume, (xv) file type and extension, and (xvi) standard specific encoding profiles. One example of a standard specific encoding profiles, includes e.g., h.264 which includes different standard encoding profiles for baseline, main, and high encoding. Additionally, the encoder 202 may utilize information used for cutting out other resolutions/aspect ratios from a higher resolution/different aspect ratio file. For example, the encoder 202 may center-punch a standard definition (SD) image or video from a high definition (HD) source. Similarly, an HD image or video may be center punched from a 4K, 8K, 16K source. In an alternative embodiment, the foregoing parameters may be used by the JITP 204, or a combination of any of the foregoing parameters may be utilized between both the JITP 204 and encoder 202. For example, the JITP 204 may utilize the segmentation duration parameters in order to splice the content streams 306 (or thumbnail stream 308) into chunks. In another example, the JITP 204 may utilize capabilities information of the end device 210 to create chunks from the output streams 306 that meet the specifications of the requesting device 210 (and put those addresses of those chunks in a manifest file).

In one variant, the encoder 202 up-converts source files 302 to produce higher bit rate and higher resolution output streams 306. This could allow smaller bit rate source files 302 to be provided to the encoder 202 or allow a source file 302 that is natively lower resolution to be encoded into a wide array of output streams 306 for use on a wider variety of user devices 210 with a greater number of resolutions. The source file 302 may comprise an uncompressed source file 302 (when received at the encoder 202) and/or a source file 302 that has various degrees of compression.

Alongside the output streams 306, a thumbnail stream 308 is generated from the source file 302. The generation of the thumbnail stream 308 contemporaneous to the generation of the output streams 306 allow for precise timing (e.g., synchronization) between the playback time code and the thumbnail display time. The thumbnail stream 308 comprises a stream of key frames (e.g., I-frames) at a certain temporal distance (e.g., 2 seconds or 10 seconds) apart. Key frames may be placed in any number of temporal distances from 0 (i.e., every frame is a key frame), to a single key frames and all delta frames per stream. A greater number of key frames allows the video stream to be segmented in a greater number of places (however, the amount of compression available may be limited where the number of key frames used is higher, but processing of the video frame would correspondingly be less because the full image does not have to be generated from predictive delta frames as frequently). In the thumbnail stream 308, transitional data may be minimized or eliminated through the use of null frames. In a further embodiment, certain transitional data (e.g., B- or P-frames) is included in the thumbnail stream 308 to further compress the stream and provide a greater variety of thumbnail images. In an additional embodiment, a plurality of thumbnail streams 308 are outputted from the encoder 202. Each of the plurality of thumbnail streams 308 may include the key frames at different resolutions or encodings or may have different data in the portions between key frames. The different data may include descriptive metadata of the content, or demographics/psychographic profiles of expected users, or information regarding how the data within the stream is formatted.

In one embodiment, the generated thumbnail images 358 or the thumbnail stream 308 may be used by the JITP 204 (or a parallel processing service) for image recognition and quality control processes. In an additional embodiment, a content curator may use the thumbnail stream 308 to scrub for the best possible image to represent the content. The curator may request from the JITP 204 a particular time code and final image details such as image proportions, image resolution, and/or file type and a thumbnail file 358 could be extracted and sent to the content management system (CMS) of the curator for use as box art or thumbnail art to represent the content.

The output streams 306 are provided to users for display of the content contained therein. The Just in Time Packager (JITP) 204 extracts thumbnails 358 from the thumbnail stream 308 (as discussed in further detail below with respect to FIG. 3*b*). In further embodiments, the encoder 202 may also break the encoded output streams 306 into chunks for use by the CDN 206 to serve to users 210. Furthermore, the encoder 202 in such embodiments generates manifest files that reference the locations of the chunks. An exemplary manifest file 354 is discussed in greater detail below with respect to FIG. 3*b*.

While output streams 306 and thumbnail stream 308 are shown as separate files (for example MPEG 4 transport stream files (.ts)). In a further embodiment of the present disclosure, all of the streams (i.e., streams 306 and 308) are all present in a single "super" file. Having a single comprehensive file comprising multiple streams (including the thumbnail stream) will lower the number of files the CDN 206 must manage. This allows for easy management around the thumbnails. A content curator would only have to manage the single file. The CMS only has to represent the single file. And the operator only would have to confirm the existence of the single file.

The encoder 202 may encode output streams 306 with audio tracks (e.g., AC3 audio). Different encoding formats and bit rates may be selected based on the requirements of the stream, end user equipment, and the protocols and formats used by the CDN 206. The thumbnail stream 308 may not be encoded with an audio track. This may allow the thumbnail stream file to have a smaller file size. In one embodiment, the thumbnail stream 308 has an audio track as discussed in further detail below.

Just in Time Packager

Figure 3B:
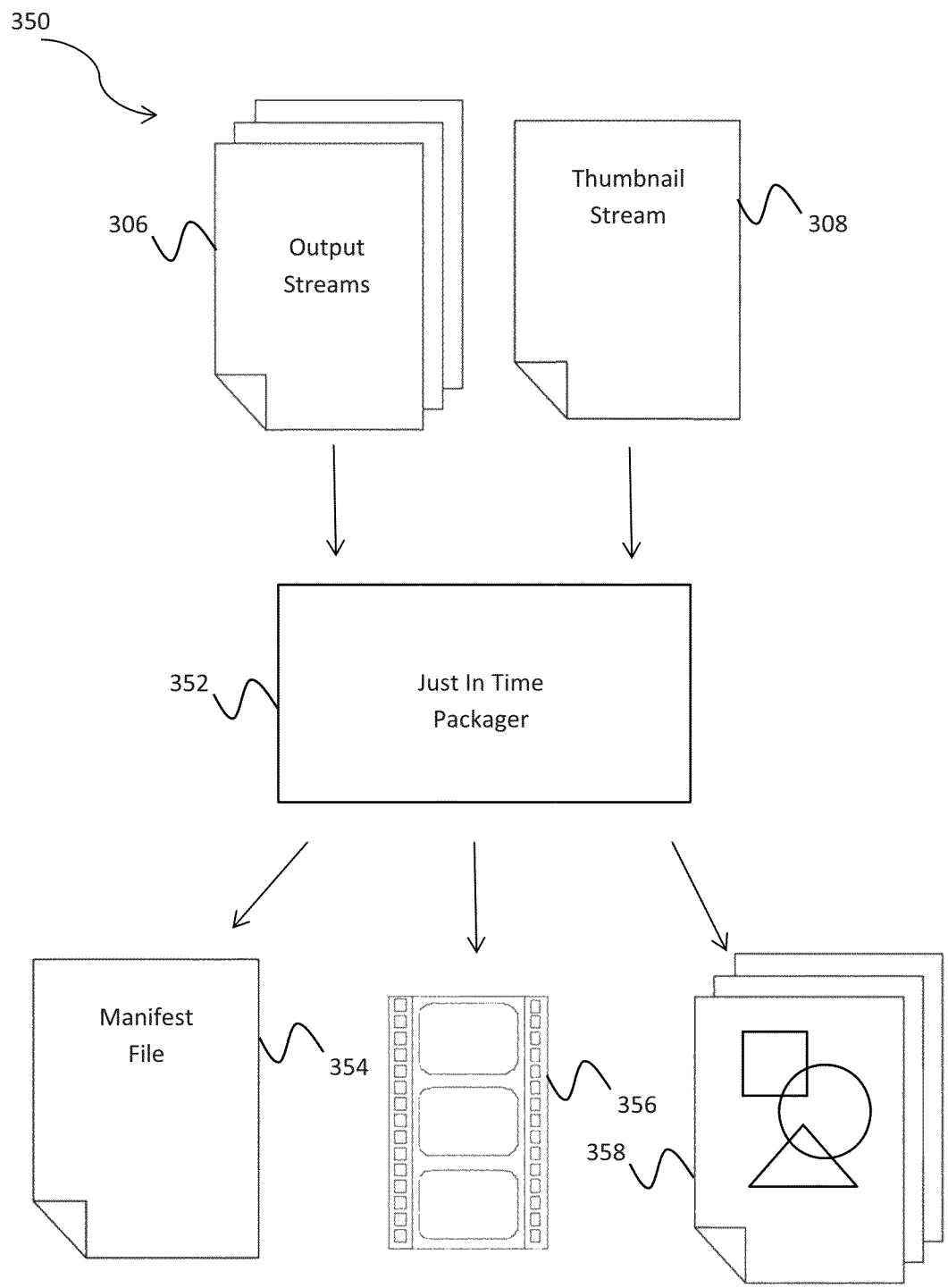
FIG. 3b is a simplified input/output diagram of a Just in Time Packager (JITP) useful in conjunction with various principles described herein.

Referring now to FIG. 3*b*, a simplified input/output diagram 350 of a Just in Time Packager (JITP) 204 is illustrated. Encoded output streams 306 and a thumbnail stream 308 are utilized by the JITP 204 to provide a manifest file 354, video chunks 356, and/or thumbnails 358 to a requesting CDN 206 or user.

Specifically, the manifest (or index/playlist) file 354 is a data structure comprising a listing of addresses for each of the chunks 356 of a stream of data (such as video chunks 356 or thumbnails 358) including bitrates, thumbnails, closed captioning, audio, etc. Different ABR models may use different manifest files 354. For example, with HTTP Smooth Streaming (HSS), each of the components (thumbnails, closed captioning, audio, etc.) are in separate files with addresses for each in the manifest. With HTTP Live Streaming (HLS), audio is embedded in the chunks 356 and thus are not separately listed in the manifest file. In an exemplary embodiment, a media client of the type discussed in co-owned co-pending U.S. application Ser. No. 14/220,021 filed on Mar. 19, 2014 and entitled "APPARATUS AND METHODS FOR RECORDING A MEDIA STREAM", which is incorporated herein by reference in its entirety may be utilized. The media client replays stored "chunked" media content 356 based on a stream manifest file 354. In one exemplary embodiment, stored video content streams chunks 356 are decompressed for playback based on information stored within an associated data structure (e.g., stream manifest file 354). Examples of information stored within the manifest file 354 may include e.g., encryption keys, supported resolutions, and digital rights information. A video client may be further configured to retrieve additional data to augment the stored chunked video content 356. For instance, a video client with a high resolution (e.g., 1920× 1080) display may consult the stream manifest file 354 for missing and/or replacement chunks 356, when attempting to replay a previously recorded lower resolution recording (e.g., 640×480). By downloading the appropriate chunks 356, the video client may support the desired high resolution.

In another embodiment, the network stream manifest 354 includes metadata, and a listing of media chunk entries. Metadata refers to information used by the media client device to interpret or otherwise manage the media chunks (metadata is also colloquially referred to as "data regarding data" or "data relating to data"). Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media chunks 356, and can be used as a reference file when assessing or otherwise making use of the media chunks 356.

In one implementation, the list of media chunk entries in the manifest file 354 comprises a list of network addresses where the corresponding chunks 356 of media content may be accessed and/or downloaded. For instance, each of the media chunk entries may be listed by a Uniform Resource Locator (URL). In some embodiments, the entries may be in computing resource "path" format. Computing paths may be either absolute (i.e., the path provides the fully elaborated and unique location of the chunk 356 in a file structure 354) or relative (i.e., the path provides a relative location of the chunk 356 in a file structure 354). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models.

In another embodiment, the service provider or MSO is represented as a single logical entity (a single network domain) represented by a characteristic URL (e.g., www-.timewarnercable.com). In other embodiments, the service provider may be a conglomeration of multiple logical entities. Multiple logical entities may be useful to further distribute services over various network resources or enable additional features provided by partnered corporations or providers. Multiple logical entities, for example, may provide local content for a particular service group or geographic area. Furthermore, having content providing entities closer to end users may offer lower latency and may add network redundancy. Common examples of network resources include e.g., broadcast, multicast, video-on-demand, advertisement services, local services, etc. In one specific example, one exemplary stream manifest file may include entries from: www.timewarnercable.com, vod.time-warner.com (video on demand services), www.nhk.jp ($3^{rd}$ party content), www.adserver.com ($3^{rd}$ party advertisement services), etc.

In another example, the media chunk listing may include a listing of URL links which is further punctuated with HTML tags or Javascript, which is configured to enable advertisement insertion and/or execution of complementary programming. For instance, the video client may substitute tailored locally stored advertisements for commercial breaks, rather than e.g., the default broadcasted commercial. In other embodiments, the video client may run a Javascript Applet that allows the subscriber to execute a command or otherwise provide feedback (e.g., to order pizza, vote on a reality show, etc.).

The thumbnail stream 308 or generated thumbnail images 358 may be used for advertisement insertions or search engine optimization (SEO). The stream 308 or images 358 may be processed in parallel by the JITP 204 or another server apparatus (e.g., a dedicated image recognition service) in communication with the CDN 206. This parallel processing allows for image recognition within the content, for example, an actor's cameo in a movie (e.g., Tom Cruise's cameo in Tropic Thunder). Furthermore, parallel processing allows for the generation of in and out points for the times the actor is in the piece of content based on all of the thumbnails 358 pulled from the JITP 204 by the image recognition service. Product placements may also be time stamped via the parallel image recognition processing. Network operators may use advertisement breaks during the presentation of the content or adjacent to the time stamp of the product placement to utilize the product placement time stamp to sell or place the advertisement block. The network operator may sell or place an advertisement for the company whose product has been placed (or, e.g., to a competitor of that company). For example, if a Coke® can is used in a scene of a movie, advertisement blocks could be sold to CocaCola® or to Pepsi® during an advertising segment adjacent to the Coke can's appearance in the movie.

In the exemplary embodiment, each media chunk 356 is an encoded (and optionally encrypted) subsection or segment of media content. The media chunks 356 (decrypted if necessary), when decoded and played in the appropriate order, render the original media content. In one implementation, each media chunk 356 represents a portion of video associated with a specific resolution, codec, and time stamp. The media chunks 356 are assembled according to a time stamp sequence.

In another embodiment, however, non-time-based segments may be used in the manifest 354. For example, playback may occur according to the context of the sequence and not because of any implied meaning of the filename, or time stamp value. The true duration of a video segment is based on its contents and its presentation time stamp (PTS), which may not be represented in the manifest. The sequence of the next file in the manifest is simply what comes next. Specifically, any schema could be used for the transport stream files in the manifest, including 1.ts, 2.ts, 3.ts, etc . . . Or A.ts, B.ts, or C.ts.

Based on the registration of a user, manifest files 354 listing all components for playback of a piece of content are generated by the JITP 204. This information includes the timecode and "playback" location for all thumbnail files 358. In an alternative embodiment, the manifest file 354 (or a plurality of manifest files 354) is pre-generated for use with one a particular ABR format. In this embodiment, the thumbnail files 358 are not generated until an address (e.g., URLS) of thumbnails are requested at which time the JITP 204 generates the thumbnail file 358 from the thumbnail stream 308.

Furthermore, manifest files 354 contain addresses (e.g., URLs) of thumbnails generated by the JITP 204 for use when a user inputs a trick (e.g., fast forward, rewind, pause, or random seek) command. The manifest files 354 are generated based on the specific device and requirements of an end user device. For example, the Microsoft® Xbox® 360 and Xbox® One video game systems require different manifest files 354 to operate. Furthermore, different streaming standards may require different manifest files 354 to operate. For example, the MPEG-Dynamic Adaptive Streaming over Hyper Text Transfer Protocol (DASH) protocol may be implemented differently with respect to Hyper Text Transfer Protocol (HTTP) live streaming and Windows® Media Streaming. Thus, each may require different manifest files 354.

Video chunks 356 chunks are generated by the JITP 204. The chunks 356 may be of predetermined length. In addition, metadata describing the chunks may be generated at the JITP 204, or, alternatively at the encoder 202. As discussed herein, the file chunks 356 form the basis for the generation of a network stream manifest file 354. It is appreciated, however, that the foregoing functionality may be accomplished at various other network entities (such as at the encoder 202 or CDN 206), the foregoing being merely exemplary. For example, chunking and encryption prior to a request for the content may optimize time to playback particularly for the first requestor. However, such a setup may pose a challenge for content management and storage scale. For example, if an encryption model is changed due to a hack the video content may need to be re-encrypted prior to service.

Access control such as Digital Rights Management (DRM), conditional access (CA), trusted domain (TD), etc. may be implemented by the JITP 204 (or alternatively the CDN 206). One example of utilization of the foregoing technologies is described within co-owned U.S. patent application Ser. No. 13/710,308 filed on Dec. 10, 2012 and entitled "APPARATUS AND METHODS FOR CONTENT TRANSFER PROTECTION", issued as U.S. Pat. No. 9,565,472 on Feb. 7, 2017, which is incorporated herein by reference in its entirety. As discussed therein content is delivered via a managed content distribution network (such as a cable or satellite or HFCu network having an MSO), and the MSO manages the rights and restrictions of the content outside of a premises, and in a data center or headend, by providing requested content to a gateway device within the premises of a user.

The content is, in the exemplary embodiment, provided in a first encryption format and encoded using a first codec, both of which are compatible with the gateway device. In order to provide for a transfer of the content within and outside of the premises network, the gateway is configured to transcrypt the content into an encryption format, and transcode using a codec, that are each compatible with a device which requests the content therefrom. In one implementation, the content is received at the gateway as MPEG-2 content encrypted using Powerkey conditional access (CA) technology. The gateway uses its associated CableCard to decrypt the content, and a transcoder entity to transcode the content to e.g., MEPG-4 (or other appropriate format). The content is then re-encrypted to DRM using a content key obtained from a DRM server and a transcrypter of the gateway. This approach advantageously preserves content rights, and asserts restrictions on use or distribution of content, via, e.g., the user's premises gateway.

Additionally, the video chunks 356 (and thumbnail files 358) may be encrypted by the JITP 204 (such as via a DES or AES algorithm via a symmetric or asymmetric key approach) prior to transfer over the network. The video chunks 356 (and thumbnail images 358) may then be decrypted by a user device.

Thumbnail files 358 are generated by the JITP 204 using the thumbnail stream 308. Alternatively, thumbnail files are generated by the JITP 204 using one or more of the output streams 306. The thumbnail stream 308 contains key frames (i.e., whole frames that fully define an image). These key frames are extracted by the JITP 204 and outputted as thumbnail images 358. In an embodiment, some but not all key frames from the thumbnail stream 308 are extracted for use as thumbnails. In an alternative embodiment, all key frames are extracted. Reference to these thumbnail images 358 is made in the manifest file 354. The JITP 204 extracts the key frames and skips over the other (e.g., null) frames in the thumbnail stream 308. The small size of the thumbnail stream 308 makes it easier to parse and extract than using the output streams 306. The thumbnail images 358 can be resized, encoded, or altered by the JITP 204 during extraction to allow for a wide variety of file types from a single thumbnail stream 308. This extraction can occur on an as needed basis upon the request of the CDN 206 or user. Thus, a multitude of thumbnail images would not need to be stored and managed by the CDN 206. The thumbnail stream 308 could be parsed and the thumbnails 358 extracted and resized/altered/encoded on the fly, in real time, by the JITP 204.

The JITP 204 (or, in an alternative embodiment the CDN 206 or another server or process) removes or deletes the extracted thumbnail images. In an embodiment, the extracted thumbnail images are removed after the requesting user has finished viewing the content. Alternatively, the extracted thumbnail images can be removed after the user session completes, when there are no longer any pending user sessions requesting the content, the thumbnail images, and/or the manifest file expires. In a further alternative embodiment, the JITP 204 may be utilized for extracting thumbnail images from a thumbnail stream and an encoder 202 segments and stores various content chunks.

ABR Streams and the Thumbnail Stream

Figure 4:
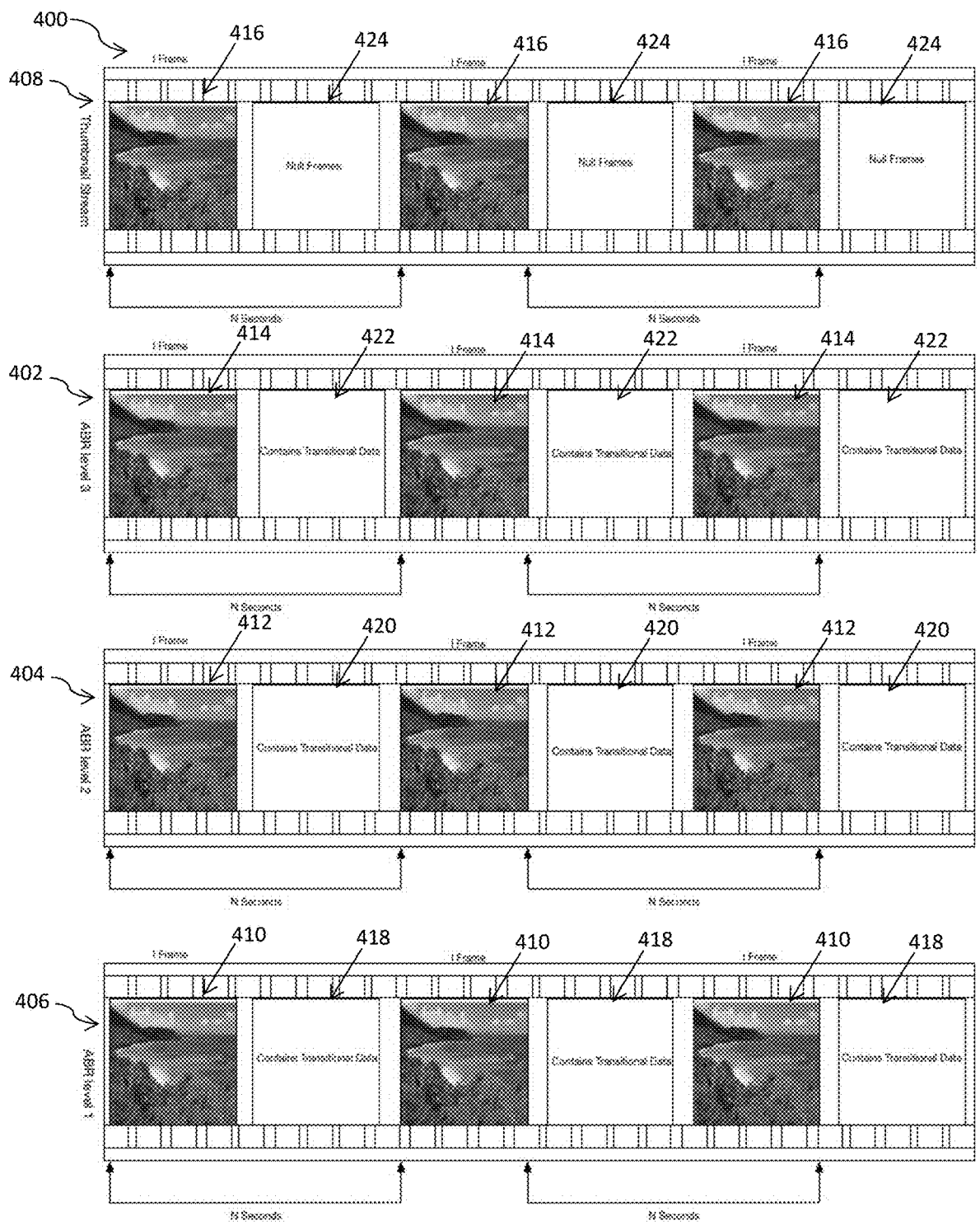
FIG. 4 is a graphical representation of various stream types useful in conjunction with various principles described herein.

Referring now to FIG. 4, a diagram 400 illustrating various stream types are shown. Streams 402, 404, and 406 illustrate three different adaptive bitrate (ABR) level streams 402, 404, 406. Stream 408 illustrates a thumbnail stream. As shown in FIG. 4, each of the key frames is spaced N seconds apart. The spacing of key frames may be as little or as much as desired for the particular application however having longer chunks may coincide with less ability to change ABR level 402, 404, 406. This is useful when using ABR as the content is broken up into standardized (i.e., equal time) chunks and so different ABR levels 402,404, or 406 may be selected for each chunk and the timing of key frames within chunks will line up. As will be understood by those of ordinary skill, having more chunks, may coincide with increased overall file sizes (due to more key frames) and greater file management. Chunks are, in one embodiment, broken up along key frame boundaries; chunks may comprise multiple key frames (and transitional frames) or only a single key frame. This depends on the length of the chunk and the level of compression of the content. In an alternative embodiment, chunks are not broken up at key frame boundaries.

Each ABR level 402, 404, and 406 is packaged a separate stream file (for example an MPEG 4 stream file). The thumbnail stream 408 is packaged in a separate stream file (e.g., MP4 file) as well. Alternatively, all of the streams can be packaged together in a single file allowing the CDN 206 to manage fewer files.

Each ABR level 402, 404, and 406 comprise key frames 410, 412, and 414. Between key frames are transitional frames 418, 420, and 422. The key frames 416 of thumbnail stream 408 are also separated by N seconds like in the ABR streams 402, 404, and 406. Unlike the ABR streams 402, 404, and 406, the thumbnail stream 408 contains no transitional data 418, 420, and 422 between key frames. Instead, null frames 424 separate the key frames 416. The null frames 416 allow the key frames 416 to be separated temporally in the video stream 408 but take up a minimal amount of storage. This allows the stream to be quickly and easily parsed to extract the key frames 416 as thumbnail images.

In an alternative embodiment, the key frames 416 in the thumbnail stream 408 are separated by a different temporal distance than the key frames 410, 412, and 414 in the ABR streams 402, 404, and 406. In further alternative embodiments, the null frames 424 are used to store other, non-content data such as stream metadata. Such non-content data can be stripped by the JITP 204 when extracting the thumbnail images.

When requested by a user or CDN 206, the JITP 204 parses the thumbnail stream 408 and extracts the key frames 416 as image files. The extracted image files may be resized or reformatted from the original images in the key frames of the thumbnail stream 408. That is, the resolution, compression, aspect ratio (e.g., cutting out or center punching the images or adding black bars), etc. may be changed depending on the request by the user or CDN 206. Furthermore, extracted image files may have filters or effects applied or closed captioning information or other data can be applied to the extracted images. The JITP 204 then temporarily (or, alternatively, permanently) stores the image files and publishes the addresses of these image files in a manifest file for use by the CDN 206 or user. Thus, thumbnail files would not need to be created and managed for each protocol, device, and resolution but instead may be generated on the fly as they are requested by the user. This solution saves disk space, requires less file management, and is scalable for the many different end user devices that would utilize the thumbnails.

ABR streams 402, 404, and 406 may contain or be associated with audio tracks. In an embodiment of the present disclosure, thumbnail track 408 does not contain or is not associated with an audio track so as to reduce the file size of the thumbnail stream 408. In an alternative embodiment, the thumbnail track 408 is associated with an audio track to create a very low bit rate stream for users that still provides a visual context for users. This embodiment provides improvements over an audio track alone or an audio track and a single thumbnail as a user may still follow the visual elements on screen.

Methods

As referenced above, various embodiments of the present disclosure are directed to schemes for the creation, storage, and playback of content streams and thumbnails.

Figure 5A:
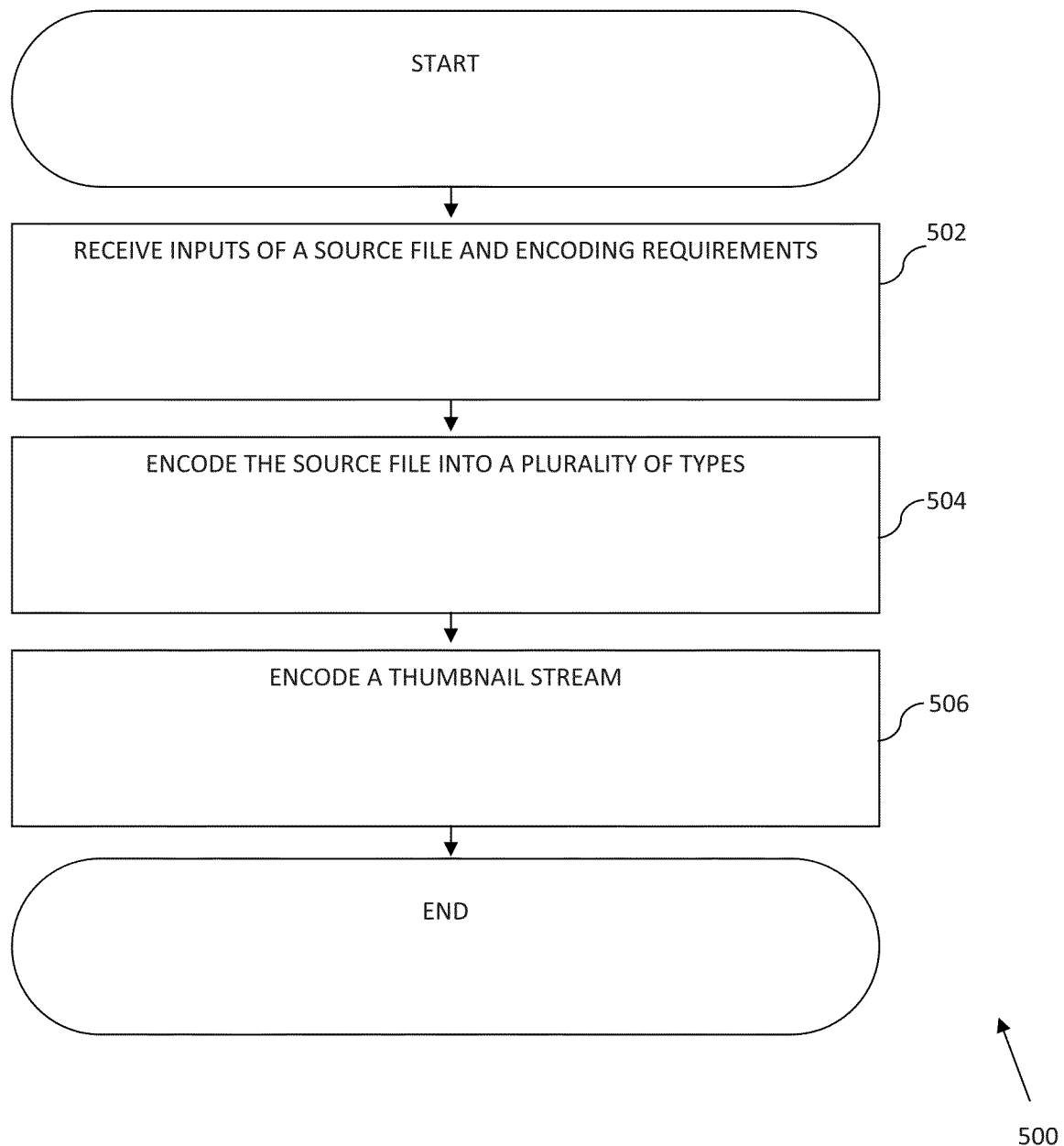
FIG. 5a is a logical flow diagram representing one embodiment of a method for encoding a content stream.

Referring now to FIG. 5a, one embodiment of a method 500 for encoding a content stream is disclosed.

At step 502 of the method 500, the encoder 202 receives inputs of a source file 302. The encoder 202 may also receive encoding requirements of the CDN 206 and/or users. The encoder 202, at step 504, encodes the source file 302 into a plurality of encoding types (i.e., creates multiple versions of the source file 302 each having a different encoding type). These may include various resolutions and formats for use by a variety of user devices; the generated versions of the source file 302 may be used for ABR streaming. At step 506, a thumbnail stream 308 is encoded. The encoding process may include stripping a previously encoded stream of its transitional frames and audio track, leaving only key frames, and encoding the thumbnail stream 308 therefrom. As discussed above, the thumbnail stream 308 comprises key frames separated by null frames. Alternatively, the encoding process processes the source file 302 and only includes certain ones of the key frames in the thumbnail stream 308.

Figure 5B:
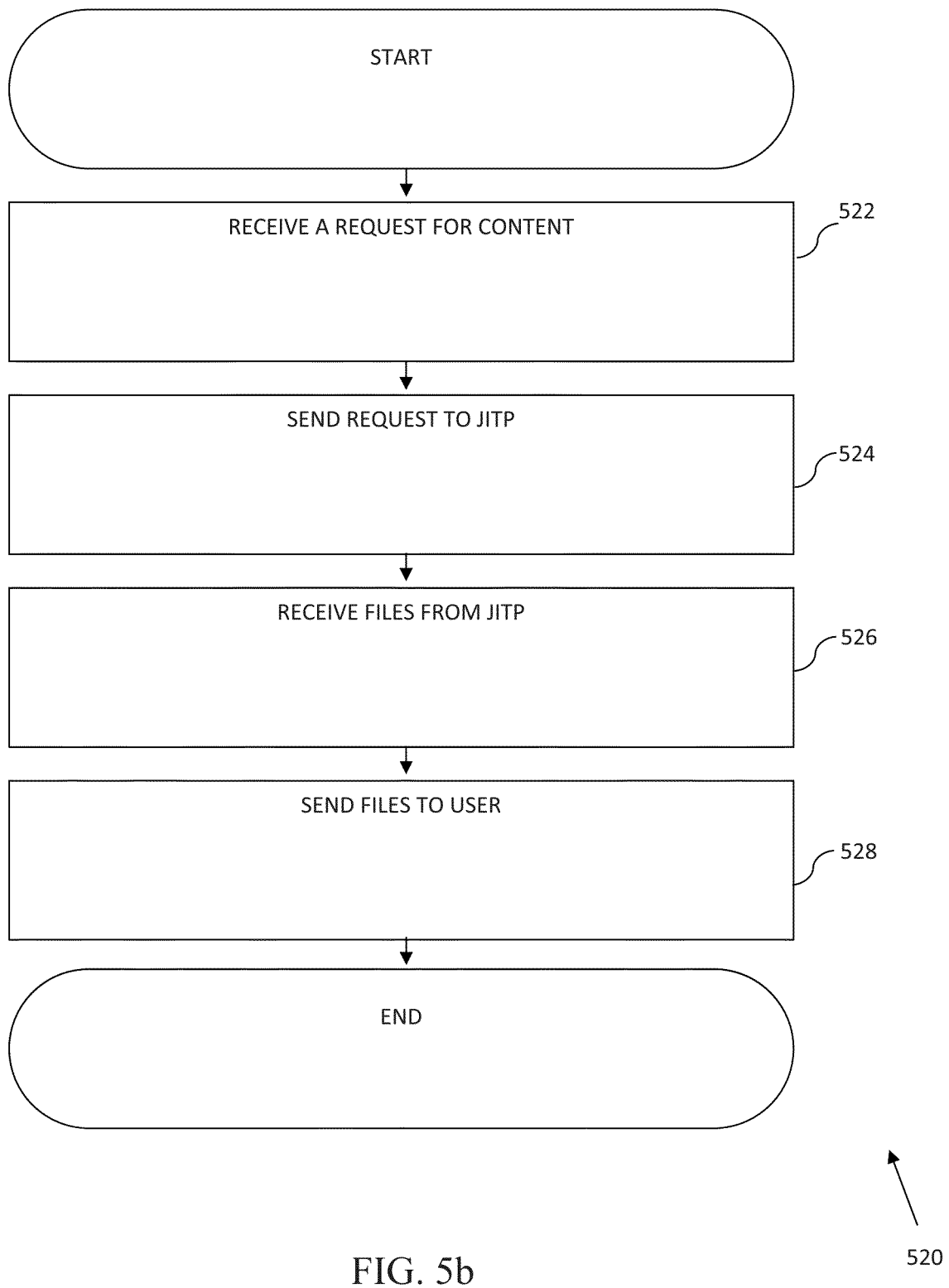
FIG. 5b is a logical flow diagram representing one embodiment of a method for operating a content delivery network.

Referring now to FIG. 5b, one embodiment of a method 520 for operating a content delivery network is disclosed.

At step 522 of the method 520, a CDN 206 receives a request for content from a user of the CDN 206. At step 524, the CDN 206 parses the request and forwards the request to a JITP 204. Along with the request for content, the CDN 206 may also send device capabilities of the user device 210 including, but not limited to, the device type, manufacturer, model number, serial number, current display resolution, file formats accepted, codecs that are displayable, bit rates that are playable, and streaming technologies accepted. Furthermore, in the case of a gateway device 210, the gateway device 210 may send the foregoing properties of the display equipment 210 (e.g., CPE, television, smart television, computer, tablet, phone, etc) or some or all of the devices 210 that the gateway device 210 serves. These device capabilities may be used to format the streams for later display on the end user devices 210.

In one embodiment, a user makes a request from a user device that passes the request through a home gateway device as disclosed in co-owned U.S. patent application Ser. No. 11/818,236 entitled "PREMISES GATEWAY APPARATUS AND METHODS FOR USE IN A CONTENT-BASED NETWORK" filed on Jun. 13, 2007, issued as U.S. Pat. No. 7,954,131 on May 31, 2011, which is incorporated herein by reference in its entirety. In this embodiment, the home gateway device passes the user device details and the request for content to the CDN 206 (which can be passed to the JITP 204).

In an alternative embodiment, the CDN 206 predicts that content will be requested at a future time period by the client based on, e.g., previous user requests or requests of content from similarly situated users (e.g., users who are demographically or psychographically similar). For example, content may be selected to align with user preferences as discussed in co-owned U.S. application Ser. No. 12/414,576 filed on Mar. 30, 2009 and entitled "RECOMMENDATION ENGINE APPARATUS AND METHODS", issued as U.S. Pat. No. 9,215,423 on Dec. 15, 2015, which is incorporated herein by reference in its entirety. Alternatively, the user may subscribe to a particular piece of content. In such embodiments, the CDN 206, during a period of low network activity (e.g., late night), may request that the JITP 204 generate chunks 356, a manifest file 354, and/or thumbnails 358 and have the user device download such content to preload the content at the user device for later viewing. In a further alternative, the CDN 206 preloads a content stream file, e.g., the highest ABR stream, or a plurality of content stream files, and the thumbnail stream 308 on the home gateway device at the user premises (with appropriate digital rights management (DRM)) and have a JITP 204 running at (or co-located with) the home gateway device generate content chunks 356, manifest files 354, and thumbnails 358 for a single or a plurality of user devices 210 (e.g., a high definition television and a user's cellular telephone) in real-time. In a further alternative, the CDN 206 preloads a source stream 302 and have the gateway device encode the different ABR streams 306 and thumbnail stream 308.

In an alternative embodiment, a virtual channel is streamed to the CPE 210 via CDN 206. The channel may comprise content that is selected for the user by the CDN 206 or the user device 210. The virtual channel may utilize content encoded by the encoder 202 and packaged by the JITP 204. For example, the content on the virtual channel may be targeted content as discussed in co-owned co-pending U.S. application Ser. No. 12/414,554 filed on Mar. 30, 2009 and entitled "PERSONAL MEDIA CHANNEL APPARATUS AND METHODS", which is incorporated herein by reference in its entirety.

At step 526, the CDN 206 receives a response to the request for content from the JITP 204. The JITP 204 provides a manifest file 354, chunks of a content file 356, and/or thumbnail files 358. At step 528, one or more of the provided files 354, 356, and/or 358 are sent to the user device 210.

Figure 5C:
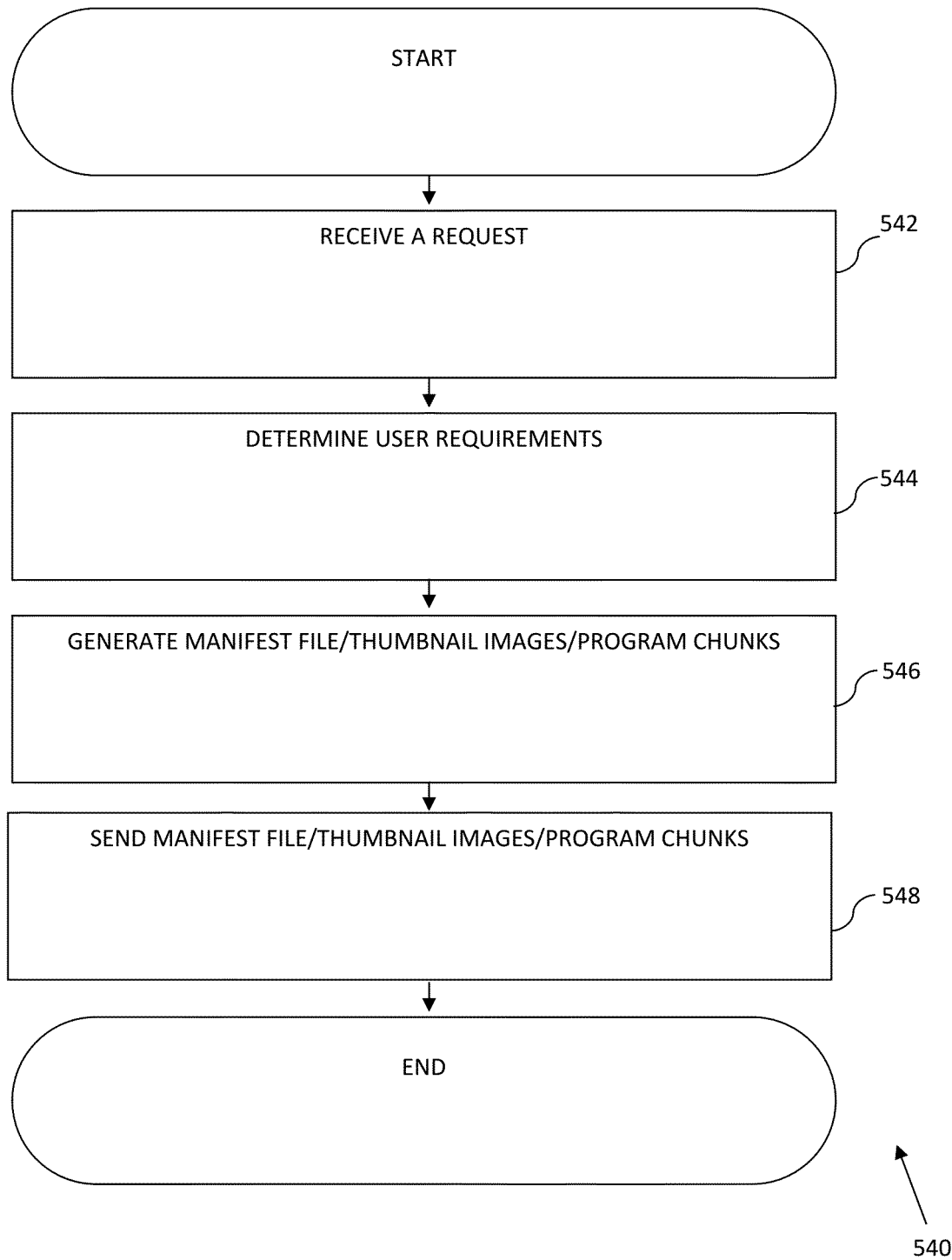
FIG. 5c is a logical flow diagram representing one embodiment of a method for operating a Just in Time Packager.

Referring now to FIG. 5c, one embodiment of the method 540 of operating a JITP 204 is disclosed.

At step 542, the JITP 204 receives a request for content from a CDN 206 on behalf of a user. At step 544, the JITP 204 determines the user requirements from the request, these include the content that is requested, the format for the content (e.g., resolution, bit rate, etc.). At step 546, thumbnails 358, program chunks 356, and/or a manifest file 354 is generated. In an embodiment, the JITP 204 determines that a user requests a number of thumbnails 358 via a trick mode request. The JITP 204 will generate the needed thumbnails 358 for the user from the thumbnail stream 308. At step 548, the JITP 204 stores the thumbnails 358 and provides the user a manifest file 354 with the addresses for the content. Alternatively, the JITP 204 sends the thumbnail files 358 to the user directly (or via the CDN 206).

Figure 5D:
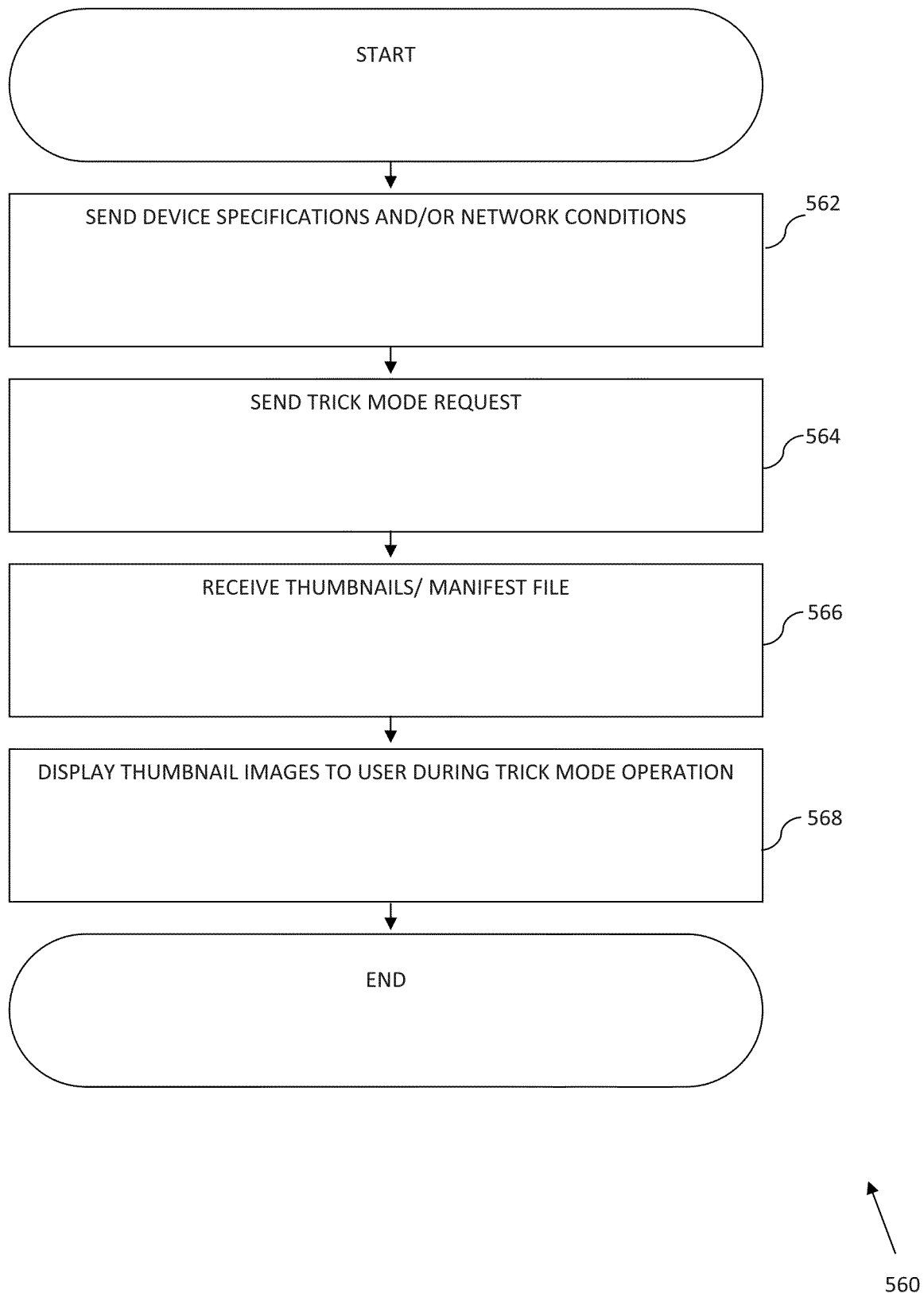
FIG. 5d is a logical flow diagram representing one embodiment of a method for operating a consumer premises equipment (CPE).

Referring now to FIG. 5d, one embodiment of the method 560 of operating consumer premises equipment (CPE) 210 is disclosed.

At step 562, the CPE 210 sends device specifications and/or network conditions to the CDN 206. The device specifications may include the device type, encryption options and settings, device aspect ratio, and supported codecs and file types. Network conditions may include current throughput, predicted available bandwidth, network latency. For example, latency may be determined as discussed in co-owned U.S. application Ser. No. 12/944,648 filed on Nov. 11, 2010 and entitled "APPARATUS AND METHODS FOR IDENTIFYING AND CHARACTERIZING LATENCY IN A CONTENT DELIVERY NETWORK", issued as U.S. Pat. No. 8,930,979 on Jan. 6, 2015, which is incorporated herein by reference in its entirety. Alternatively (or additionally), the device may send an acceptable bitrate for the content stream based on network conditions. For example, a user could detect throughput of 3 Mbps (Megabits per second) and request a bitrate of 2.25 Mbps (75% of the detected throughput). The proportion of available bandwidth can be based on other current bandwidth uses, predicted bandwidth uses, or the number (or ratio) of retransmission requests sent.

At step 564, a user enters a trick mode command (e.g., fast forward, rewind, pause, or random seek), and the CPE 210 requests thumbnail images 358 based on the trick mode request. At step 566, the CPE 210 receives the thumbnails 358 or a manifest file 354 containing the locations of the thumbnails 358 on the network. In the later embodiment, the CPE 210 then downloads the thumbnails 358 from the locations listed in the manifest file 354.

In one implementation, the manifest 354 has a fixed number of content chunk entries which are sequentially ordered. For example, typical playlists consist of ten (10) six-second (6 s) chunks of video content, representing a minute of video. As each chunk is played, a replacement chunk is added (similar to a First-In-First-Out (FIFO) buffer). Other implementations may expand or contract or have non-sequential ordering according to e.g., various network considerations. For example, the network stream manifest may dynamically adjust length based on available servers, available bandwidth, etc. In other cases, the network stream manifest may have a first section (e.g., for program content), and a second lower priority section for background loading (e.g., for advertisements). For streams which support multiple different technologies and/or resolutions, the stream manifest may be "striped" or split into portions, each stripe or portion associated with a particular technology or resolution, etc. Furthermore, the manifest 354 may contain a fixed number of thumbnail images 358 which are sequentially ordered. For example, a playlist may contain 20 thumbnails of video content representing two minutes of thumbnails (i.e., one thumbnail per six seconds). Such thumbnails 358 represent one forward minute and one rewind minute of thumbnail images.

At step 568, the CPE displays the thumbnail images 358 to the user while the user browses the trick mode operation. For example, when a user enters the rewind command a minute of rewind thumbnail images (in reverse) are loaded into a buffer and displayed for the user while the user remains in rewind mode. The display of thumbnail images follows the current location in the piece of content. In an embodiment, the display of thumbnail images accelerate the longer the command is executed or remain the same speed throughout. In another example embodiment, when a user enters the fast forward command a minute of forward thumbnail images are loaded into a buffer and displayed for the user while the user remains in fast forward mode. The display of thumbnail images follows the current location in the piece of content. In an embodiment, the display of thumbnail images accelerate the longer the command is executed or upon multiple button presses or remain the same speed throughout.

In one exemplary embodiment the user seeks at a random location on a location bar in a piece of content, if a thumbnail 358 needed is contained in the current manifest file 354, the thumbnail image 358 can be displayed. When the thumbnail 358 corresponds to a portion of video content that is outside the current manifest file 354, the user device 210 requests a new manifest file 354 with the needed thumbnails 358 (and the JITP 204 generates the new manifest file 354 and thumbnails 358 from the thumbnail stream 308). In an alternative embodiment, the manifest file 354 contains addresses to all thumbnail images 358 and the device 210 downloads them when needed in response to user action.

Figure 5E:
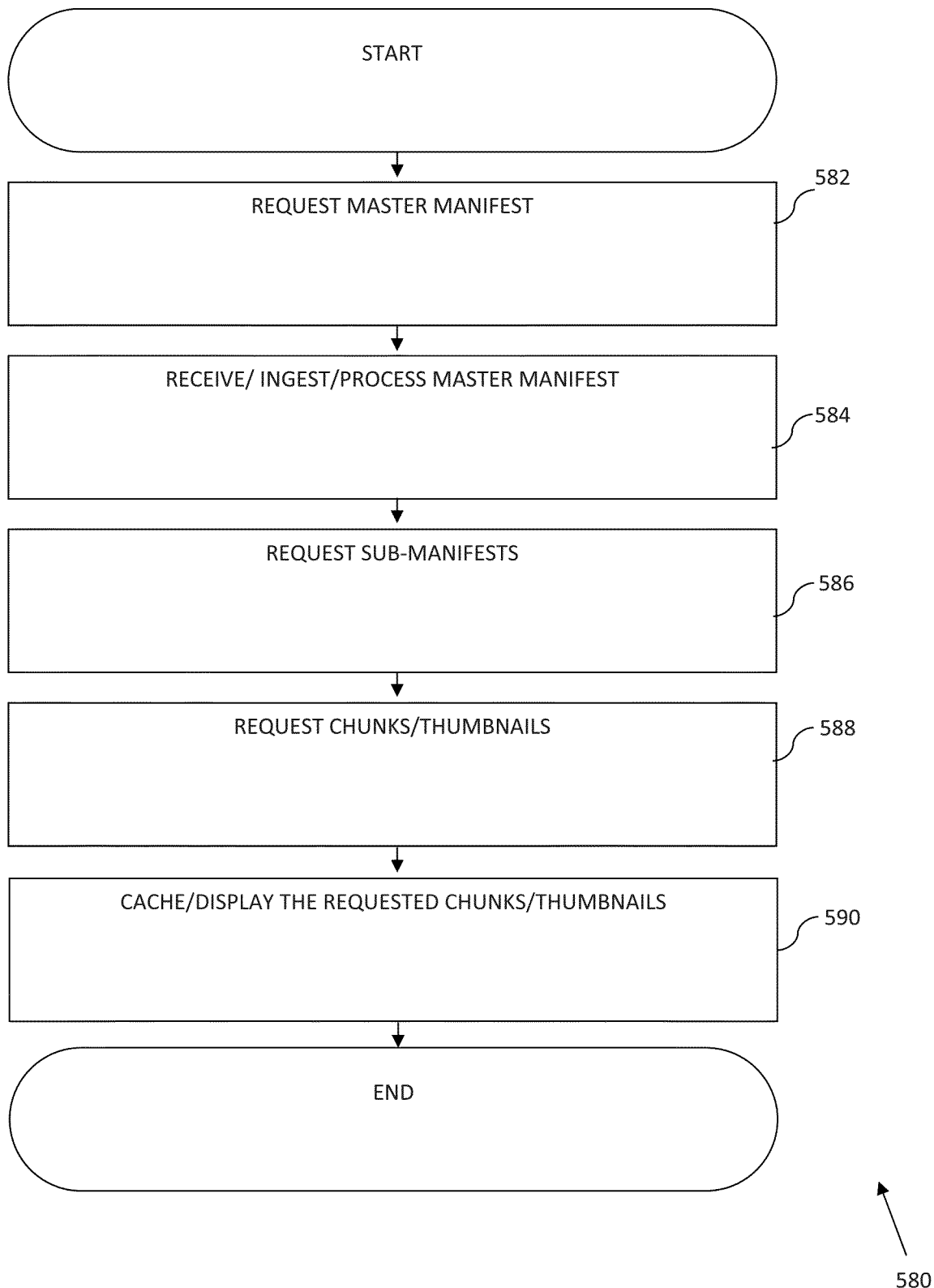
FIG. 5e is a logical flow diagram representing another embodiment of a method for operating a consumer premises equipment (CPE).

Referring now to FIG. 5e, another embodiment of the method 580 of operating consumer premises equipment (CPE) 210 is disclosed. At step 582, the CPE 210 receives a request from a user for a piece of content. In response, the CPE 210 generates a request for a master manifest file from the CDN 206. In return, the CDN 206 will send the CPE 210 a copy of the master manifest file.

At step 584, the CPE 210 receives the master manifest file from the CDN 206 and processes the master manifest file.

At step 586, the CPE 210 requests sub-manifests from the CDN 210 based on the master manifest file received. These sub-manifests 354 may be generated by the JITP 352 upon registration of the asset, upon the first request by any user and then cached by the CDN 210, or generated in real-time. The sub-manifest files 354 comprise chunks and image listings and the addresses of these chunks 356 and images 358. The chunks 356 and images 358 listed may include a variety of chunks 356 and thumbnail images 358 for use on a variety of devices or with different bit rates/file sizes for use with adaptive bitrate (ABR) streaming. The CDN 210 will then send the requested sub-manifest files to the CPE 210.

At step 588, the CPE 210 uses the sub-manifest files 354 to request content chunks 356 and/or thumbnail images 358 from the CDN 210 based on a user request. For example, when a user utilized the rewind function, the CPE 210 requests a number of thumbnail images (in reverse) for display to the user during the trick mode operation. Similarly, with fast forward functionality, the CPE 210 requests a number of thumbnail images (going forward) for display to the user. During random seek operation, the CPE 210 may request thumbnails both before and after the time of the content.

When the CDN 210 receives a request for a chunk/thumbnail the CDN 210 will serve the respective file 356 or 358 immediately if it is cached. If the file 356 or 358 is not cached, the CDN 210 calls the JITP 352 and requests the JITP 352 generate, package, and process the content chunk 356 or thumbnail 358. The CDN 210 then caches and serves the requested content file(s) 356 or 358 to the CPE 210.

At step 590, the CPE 210, upon receipt of the requested chunks 356 and/or thumbnails 358 may display the received chunk 356 or thumbnail 358 or cache the thumbnail 358 or chunk 356 for later display.

When the asset expires at the CDN 210, the cached thumbnails 358/chunks 356 are removed and the pre-generated manifests by the JITP 204 may be removed. If a request is made for these files after removal, the CPE 210 requesting the files will receive an error that the file is not found (e.g. a 404 error) or the respective file will be generated by the JITP 204 and served by the CDN 210, in one embodiment.

Additional Services

Figure 6:
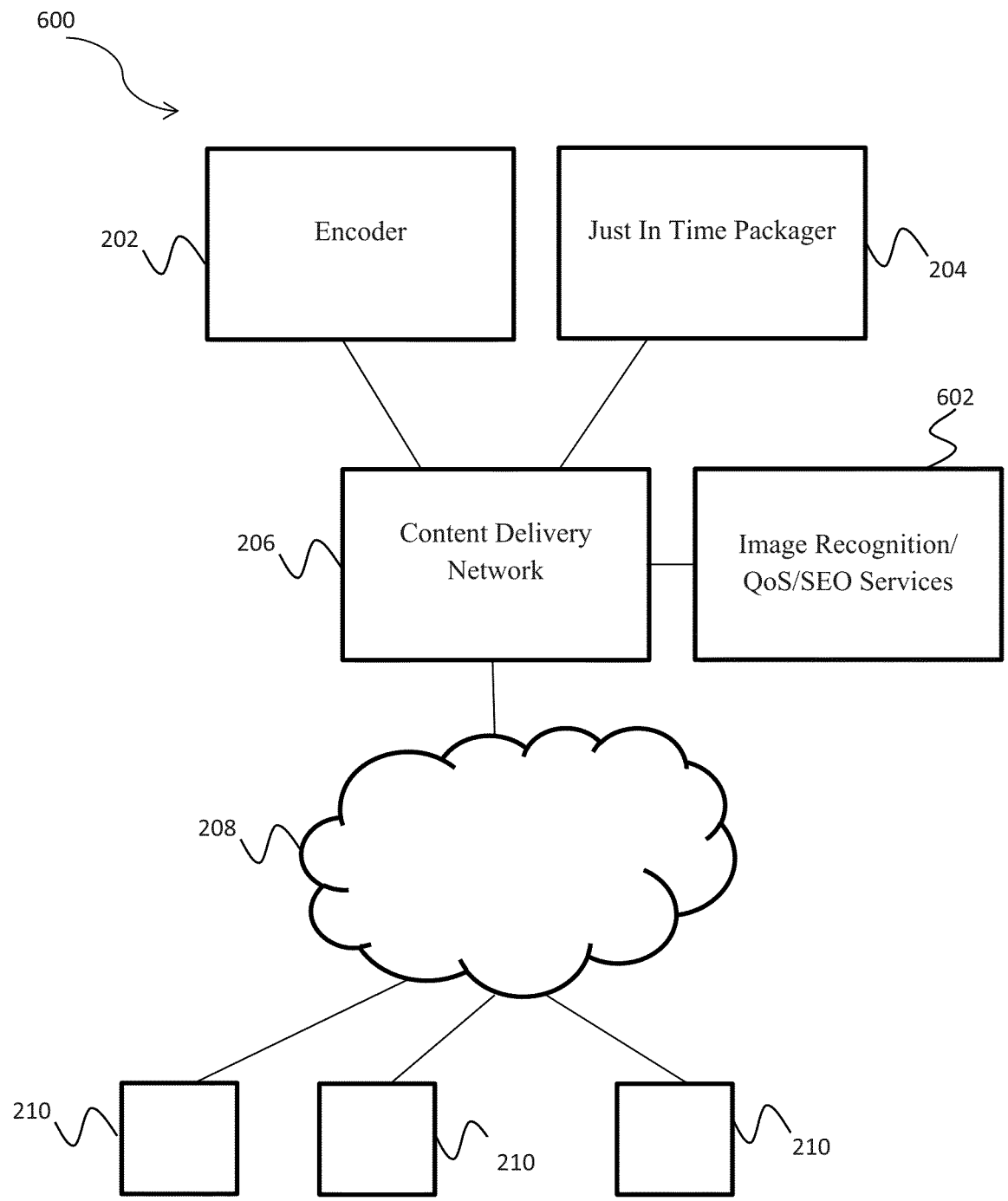
FIG. 6 is a functional block diagram of an exemplary network useful in conjunction with various principles described herein.

Referring now to FIG. 6, an exemplary configuration of a network useful with the present disclosure is illustrated. FIG. 6 discloses an exemplary configuration of an architecture 600 for providing video content and additional services to users 210 via a content delivery network (CDN) 206. The CDN 206 is in communication with users 210 via the network 208.

In one embodiment of the present disclosure, the network 208 comprises an internet, such as e.g., the Internet. As shown, the CDN 206 is in communication with an encoder 202, a Just in Time Packager (JITP) 204, and additional services 602. In one embodiment of the present disclosure, the encoder 202 encodes a source file into at least one further encoding format (e.g., transcodes a source file from one format to at least one other format) including encoding a thumbnail stream 308.

Additional services 602 may include image recognition, quality of service (QoS) checking, and search engine optimization (SEO) services. Such services 602 may utilize the thumbnail stream 308 and/or the service of the JITP 204 to perform real-time services for a client device 210.

In one embodiment, Quality Control services are performed. These services may be performed by a separate entity 602, or in the JITP 204 (or encoder 202). The entity 602 may check via the thumbnail stream 308 or thumbnails 358 whether there are any all black frames or groups of frames in the thumbnail stream 308. In a variant, all black frames or groups of black frames within the thumbnail stream 308 raises a flag that a problem has occurred at the encoder 202, by the JITP 204, or another portion of the network (e.g., CDN 206). When such an error is found the error may be (i) logged, (ii) thumbnails 358 may be regenerated, (iii) the thumbnail stream 308 may be re-encoded (via encoder 202), and/or (iv) all or parts of the source content file may be re-encoded (via encoder 202). These checks may be done in real-time (or faster than real-time) or just prior to a user's request on forward video and corrections may be made to the content/images in real-time to improve the user experience.

In a further embodiment Search Engine Optimization (SEO) services are performed. These services may be performed by a separate entity 602, or in the JITP 204 (or encoder 202). Image recognition may be performed on the thumbnail stream 308 or individual thumbnail images 358 to identify faces, products, or corporate logos. The service 602 may pull still images from the JITP 352 and perform such recognition in real-time for a user or may perform such recognition any time following encoding or packaging. The faces of actors/products/or logos may be identified in the thumbnail images 358 or the thumbnail stream 308 and this data (e.g., time stamps of the locations, listings of the products/logos/actors) may be recorded within the asset itself (e.g., in an encoded file), or in a file containing meta-data. For example, a user may search for all of the Brad Pitt scenes in Ocean's Eleven or all movie scenes containing Brad Pitt generally. The search may query the metadata that was gathered via image recognition of the thumbnail stream 308 or images 358 or may perform a search through the thumbnail stream 308 of an asset in real time based on the search criteria of a user. The same image recognition may occur for corporate logos in movies, for example finding all of the scenes where the Coca-Cola logo is displayed. Advertising may be sold to these corporations whose logos/products appear (or their competitors) in advertising spots adjacent to (e.g., before or after) these logo/product appearances which may occur in real-time for real-time advertisement insertion. Furthermore, advertisements or alerts may be displayed on screen to a user watching content when a product or logo appears allowing the user to interact with that element.

In a further embodiment, box art (e.g. display artwork) may be scrubbed from thumbnail files 358 from a thumbnail stream 308 of an asset. These thumbnails 358 may be used in an electronic programming guide (EPG) particularly when another pre-selected image is not made available. In a variant, the thumbnail stream 308 (or a portion thereof) may be displayed in the EPG itself to potential viewers. Real-time generated box art may be used in search results as well. Default time codes may requested from the JITP 352 for particular thumbnail images or particular images may be curated. Image recognition may be performed on the thumbnail image to determine if the image is suitable for all audiences (e.g., to determine there is no adult content) or to determine if a main character (or a particular objector logo) is in the box art. Text, e.g., the title of the asset, may be written in real-time on the image or the image may be manipulated (e.g., aspect ratio changed) as well. In a further variant, the box art also may be curated and chosen using a thumbnail image 358 generated from the stream 308.

As will be readily understood by those of ordinary skill in the art given the present disclosure, virtually any use of thumbnail converted video (or a thumbnail stream) may utilize embodiments of the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

What is claimed is:

1. Computerized encoder apparatus, the computerized encoder apparatus comprising:
    first data interface apparatus configured to communicate with a network;
    storage apparatus; and
    processor apparatus in data communication with the first data interface apparatus and the storage apparatus and configured to execute at least one computer program, the at least one computer program comprising a plurality of instructions which are configured to, when executed on the processor apparatus, cause the computerized encoder apparatus to:
        generate a plurality of video data from a content source for use with adaptive bitrate streaming, the plurality of video data comprising:
            a thumbnail stream comprising a first plurality of key frames separated by one or more null frames, the thumbnail stream configured to have the first plurality of key frames extracted and be transmitted to a computerized user device during a trick mode operation of the computerized user device; and
            at least one other encoded stream, the at least one other encoded stream comprising a second plurality of key frames separated by delta frames;
        wherein the generation of the plurality of video data comprises contemporaneous generation of the thumbnail stream and the at least one other encoded stream.

2. The computerized encoder apparatus of claim 1, wherein the first plurality of key frames of the thumbnail stream and the second plurality of key frames of the at least one other encoded stream are synchronized.

3. The computerized encoder apparatus of claim 1, wherein the at least one other encoded stream comprises a plurality of streams each associated with a different bit rate configured for use with the adaptive bit rate streaming.

4. The computerized encoder apparatus of claim 1, wherein the thumbnail stream and each stream of the at least one other encoded stream are packaged in separate transport stream files.

5. The computerized encoder apparatus of claim 1, wherein the at least one other encoded stream comprises an audio track.

6. The computerized encoder apparatus of claim 1, wherein the plurality of instructions which are further configured to, when executed on the processor apparatus, cause the computerized encoder apparatus to encode the thumbnail stream so as to leave only the first plurality of key frames, the extraction of the first plurality of key frames based on the encoded thumbnail stream.

7. The computerized encoder apparatus of claim 1, wherein the one or more null frames separating the first plurality of key frames comprise metadata descriptive of the first plurality of key frames.

8. A non-transitory computer-readable apparatus comprising a storage medium, the storage medium comprising a plurality of instructions configured to, when executed on a processing apparatus, cause a computerized apparatus to:
    obtain data configured to enable adaptive bitrate streaming of video, the obtained data comprising:
        first data comprising a thumbnail data stream, the thumbnail data stream comprising a plurality of key frames at least partially interleaved with a plurality of null frames;
        second data comprising an encoded data stream, the encoded data stream comprising a second plurality of key frames, and a plurality of transitional frames; and
        third data comprising data indicative of locations of the plurality of key frames; based at least on an initiation of a trick mode operation, extract at least a portion of the plurality of key frames from the thumbnail data stream based at least on the third data; and
    enable display of a plurality of thumbnails, the plurality of thumbnails generated based at least on the extracted plurality of key frames;
    wherein the extraction of the at least portion of the plurality of key frames from the thumbnail data stream based at least on the third data comprises an automatic skipping of each of the plurality of null frames.

9. The non-transitory computer-readable apparatus of claim 8, wherein each of the plurality of null frames comprise non-content data, and each of the plurality of key frames is correlated to one or more of the plurality of null frames at least via the non-content data, the non-content data comprising metadata that relates the plurality of key frames to the plurality of null frames.

10. The non-transitory computer-readable apparatus of claim 8, wherein the plurality of key frames are separated by a prescribed temporal distance.

11. The non-transitory computer-readable apparatus of claim 8, wherein:
    at least some of the plurality of key frames are separated by one of (i) a first temporal distance or (ii) a second temporal distance different from the first temporal distance; and
    at least some of the second plurality of key frames are separated by another one of the first or second temporal distances.

12. The non-transitory computer-readable apparatus of claim 8, wherein the plurality of instructions are further configured to, when executed on the processing apparatus, cause the computerized apparatus to: enable selection among a plurality of bitrates, and apply the selected bitrate to the encoded data stream and the thumbnail data stream.

13. The non-transitory computer-readable apparatus of claim 8, wherein the second plurality of key frames are separated by the transitional frames by a prescribed temporal distance, the transitional frames comprising delta frames.

14. A computerized method of processing a digital content stream, the computerized method comprising:

obtaining a content stream and a thumbnail stream, the thumbnail stream comprising a plurality of key frames each separated by one or more null frames, the one or more null frames comprising metadata correlated to a corresponding one of the plurality of key frames, the thumbnail stream configured to enable extraction of at least a portion of the plurality of key frames by a computerized user device based at least on the metadata; and during operation associated with a trick mode, generating one or more thumbnails from the extracted at least portion of the plurality of key frames;

wherein the extracted at least portion of the plurality of key frames are grouped into one or more chunks of digital data of dynamically adjustable length, the dynamically adjustable length based at least on one or more network conditions.

15. The computerized method of claim 14, wherein the obtaining of the content stream comprises obtaining a second plurality of key frames each separated by one or more transitional frames.

16. The computerized method of claim 15, further comprising:

enabling selection from a plurality of adaptive bitrate levels; and applying the selected adaptive bitrate level to the thumbnail stream and the content stream.

17. The computerized method of claim 15, further comprising separating the plurality of key frames and the second plurality of key frames each by a selected temporal distance.

18. The computerized method of claim 15, further comprising separating the plurality of key frames are by a first temporal distance, and separating the second plurality of key frames are by a second temporal distance different from the first temporal distance.

19. The computerized method of claim 14, further comprising encoding the thumbnail stream, the encoding of the thumbnail stream comprising removing the one or more null frames so as to leave only the plurality of key frames and enable said extraction of the at least portion of the plurality of key frames.

20. The computerized method of claim 14, further comprising encoding the content stream, the encoding of the content stream comprising creating a plurality of versions of the content stream each having a different bitrate associated therewith.

21. Computerized encoder apparatus, the computerized encoder apparatus comprising:

first data interface apparatus configured to communicate with a network;

storage apparatus; and processor apparatus in data communication with the first data interface apparatus and the storage apparatus and configured to execute at least one computer program, the at least one computer program comprising a plurality of instructions which are configured to, when executed on the processor apparatus, cause the computerized encoder apparatus to:

generate a plurality of video data from a content source for use with adaptive bitrate streaming, the plurality of video data comprising:

a thumbnail stream comprising a first plurality of key frames separated by one or more null frames, the thumbnail stream configured to have the first plurality of key frames extracted and be transmitted to a computerized user device; and at least one other encoded stream, the at least one other encoded stream comprising a second plurality of key frames separated by delta frames;

wherein the generation of the plurality of video data is performed so as provide temporal synchronization between the thumbnail stream and a playback time code associated with the at least one other encoded stream.

* * * * *